(12) United States Patent
Chan et al.

(10) Patent No.: US 9,585,077 B2
(45) Date of Patent: Feb. 28, 2017

(54) SYSTEMS AND METHODS FACILITATING JOINT CHANNEL AND ROUTING ASSIGNMENT FOR WIRELESS MESH NETWORKS

(71) Applicant: The Hong Kong University of Science and Technology, Kowloon, Hong Kong (CN)

(72) Inventors: Shueng Han Gary Chan, Hong Kong (CN); Wa Lun Hong, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 163 days.

(21) Appl. No.: 14/401,494

(22) PCT Filed: May 16, 2013

(86) PCT No.: PCT/CN2013/000586
§ 371 (c)(1),
(2) Date: Nov. 14, 2014

(87) PCT Pub. No.: WO2013/170635
PCT Pub. Date: Nov. 21, 2013

(65) Prior Publication Data
US 2015/0139208 A1    May 21, 2015

Related U.S. Application Data

(60) Provisional application No. 61/688,573, filed on May 17, 2012.

(51) Int. Cl.
*H04W 40/16* (2009.01)
*H04L 12/70* (2013.01)
(Continued)

(52) U.S. Cl.
CPC .............. *H04W 40/16* (2013.01); *H04L 45/00* (2013.01); *H04L 45/02* (2013.01); *H04L 45/125* (2013.01);
(Continued)

(58) Field of Classification Search
None
See application file for complete search history.

(56) References Cited

U.S. PATENT DOCUMENTS 7,643,469 B2   1/2010   Alicherry et al.
7,773,559 B2   8/2010   Chen et al.
(Continued)

FOREIGN PATENT DOCUMENTS

CN   102340327 A   2/2012

OTHER PUBLICATIONS

Akyildiz, et al.. "Wireless mesh networks: a survey". Computer Networks 47 (2005) 445-487; Elsevier. Retrieved on Jun. 3, 2015, 43 pages.
(Continued)

*Primary Examiner* — Anh Ngoc Nguyen
(74) *Attorney, Agent, or Firm* — Amin, Turocy & Watson, LLP

(57) ABSTRACT

Systems, methods and apparatus facilitating joint channel and routing assignment are provided. In some embodiments, a system includes nodes in a network configured to perform distributed joint channel and routing assignment of traffic through exchange of information with one another. The assignments are iteratively updated based on whether the update will result in an increase in a value of a function associated with throughput for traffic in the network. In some embodiments, the assignments are determined based on random decisions that are adopted if the function is improved utilizing the routing and channel information in
(Continued)

the assignment. In some embodiments, the assignments are determined based on traffic prioritization in which destination nodes having a high level of traffic are assigned routes and channels having characteristics amenable to reduction of interference in the network.

20 Claims, 21 Drawing Sheets

(51) Int. Cl.
*H04L 12/701* (2013.01)
*H04W 40/00* (2009.01)
*H04L 12/729* (2013.01)
*H04L 12/751* (2013.01)
*H04W 84/18* (2009.01)

(52) U.S. Cl.
CPC .............. *H04L 47/00* (2013.01); *H04W 40/00* (2013.01); *H04W 84/18* (2013.01)

(56) References Cited

U.S. PATENT DOCUMENTS

| | | | |
|---|---|---|---|
| 7,899,027 B2 | 3/2011 | Castagnoli et al. | |
| 2007/0153702 A1* | 7/2007 | Khan Alicherry .. | H04W 72/082 370/252 |
| 2008/0043707 A1 | 2/2008 | Ren et al. | |
| 2008/0144587 A1 | 6/2008 | Gupta et al. | |
| 2008/0240078 A1 | 10/2008 | Thubert et al. | |

OTHER PUBLICATIONS

Alicherry, et al. "Joint Channel Assignment and Routing for Throughput Optimization in Multiradio Wireless Mesh Networks". IEEE Journal on Selected Areas in Communications, vol. 24, No. 11, Nov. 2006, 12 pages.

Audhya, et al. "A survey on the channel assignment problem in wireless networks". Wireless Communications and Mobile Computing, 2011. Published online Mar. 1, 2010 in Wiley Online Library (wileyonlinelibrary.com). Retrieved on Jun. 3, 2015, 27 pages.

Avallone, et al. "A Channel Assignment Algorithm for Multi-Radio Wireless Mesh Networks". Proceedings of the International Conference on Computer Communications and Networks(ICCCN), pp. 1034-1039, 2007. Retrieved on Jun. 3, 2015, 6 pages.

Bakhshi, et al. "On-line joint QoS routing and channel assignment in multi-channel multi-radio wireless mesh networks". Computer Communications, 34(11):1342-1360, 2011. Retrieved on Jun. 3, 2015, 19 pages.

Blough, et al. "Approximation algorithms for wireless link scheduling with SINR-based interference". IEEE/ACM Transactions on Networking, vol. 18, No. 6, Dec. 2010. Retrieved on Jun. 3, 2015, 12 pages.

Bruno, et al. "Mesh networks: commodity multihop ad hoc networks". IEEE Communications Magazine, Mar. 2005. Retrieved on Jun. 3, 2015, 9 pages.

Chen, et al. "PASA: Power Adaptation for Starvation Avoidance to Deliver Wireless Multimedia." IEEE Journal on Selected Areas in Communications, vol. 21, No. 10, Dec. 2003, 11 pages.

Chen, et al. "Perfectly fair channel assignment in non-cooperative multi-radio multi-channel wireless networks". Computer Communications, 32:1058-1061, 2009. retrieved on Jul. 21, 2015, 4 pages.

Cheng, et al. "Joint Multicast Routing and Channel Assignment in Multiradio Multichannel Wireless Mesh Networks Using Tabu Search". 2009 Fifth International Conference on Natural Computation, retrieved on Jul. 21, 2015, 6 pages.

Chiu, et al., "J-CAR: An efficient joint channel assignment and routing protocol for IEEE 802.11-based multi-channel multi-interface mobile Ad Hoc networks." IEEE Transactions on Wireless Communications, vol. 8, No. 4, Apr. 2009. 10 pages.

Dhananjay, et al. "Practical, distributed channel assignment and routing in dual-radio mesh networks". Proceedings of the ACM SIGCOMM '09 conference on data communication. Aug. 2009, Barcelona, Spain. 12 pages.

Draves, et al., "Routing in multi-radio, multi-hop wireless mesh networks." Proceedings of the 10th annual international conference on Mobile computing and networking in MobiCom '04, Philadelphia, Pennsylvania. Sep.-Oct. 2004. 15 pages.

Gao, et al. "A game approach for multi-channel allocation in multi-hop wireless networks". Proceedings of the 9th ACM international symposium on Mobile ad hoc networking and computing in MobiHoc '08, May 2008. Hong Kong, China. 10 pages.

Halldorsson, et al., "On spectrum sharing games." Proceedings of the twenty-third annual ACM symposium on Principles of distributed computing in PODC '04, Jul. 2004. St. Johns, Newfoundland, Canada. 8 pages.

Huang, et al. "A QoS Routing Protocol (CATR) Based on Channel Assignment and Timeslot Reservation". Proceedings of the International Conference on Communications and Mobile Computing (CMC), 2009, 8 pages.

Kanthi, et al., "Spanner Based Distributed Channel Assignment in Wireless Mesh Networks." Proceedings of the International Conference on Communication Systems Software and Middleware(COMSWARE), 2007. 10 pages.

Karrer, et al. "Enabling large-scale wireless broadband: the case for TAPs". ACM SIGCOMM Computer Communications Review, vol. 34, No. 1: Jan. 2004. 6 pages.

Kyasanur, et al. "Capacity of multi-channel wireless networks: impact of number of channels and interfaces". Proceedings of the 11th annual international conference on Mobile computing and networking in MobiCom'05, Aug. 28-Sep. 2, 2005, Cologne, Germany, 15 pages.

Mishra, et al. "Weighted coloring based channel assignment for WLANs". SIGMOBILE Mob. Comput. Commun. Rev., 2005. 12 pages.

Raniwala, et al., "Architecture and algorithms for an IEEE 802.11-based multi-channel wireless mesh network." Proceedings of the IEEE International Conference on Computer Communications(INFOCOM), vol. 3, 2005. 16 pages.

Raniwala, et al., Centralized channel assignment and routing algorithms for multi-channel wireless mesh networks. SIGMOBILE Mobile Computing and Communications Review, vol. 8, No. 2, 2004. 16 pages.

Saraydar, et al. "Efficient power control via pricing in wireless data networks". IEEE Transactions on Communications, vol. 50, No. 2, Feb. 2002, 13 pages.

Shin, et al., "Distributed Channel Assignment for Multi-radio Wireless Networks." IEEE International Conference on Mobile Adhoc and Sensor Systems (MASS), 2006. 10 pages.

Vallam, et al. "A non-cooperative game-theoretic approach to channel assignment in multi-channel multi-radio wireless networks". Wireless Networks, 2011. 25 pages.

Wang, et al. "Flow-Based Real-Time Communication in Multi-Channel Wireless Sensor Networks". Wireless Sensor Networks, EWSN 2009, LNCS 5432, 2009. 20 pages.

Wu, et al. "Globally Optimal Channel Assignment for Non-Cooperative Wireless Networks." Proceedings of the IEEE International Conference on Computer Communications(INFOCOM), 2008, 9 pages.

Wu, et al., "Distributed Channel Assignment and Routing in Multiradio Multichannel Multihop Wireless Networks." IEEE Journal on Selected Areas in Communications, vol. 24, No. 11, Nov. 2006. 12 pages.

Xiao, et al., "A joint selfish routing and channel assignment game in wireless mesh networks." Computer Communications 31 (2008), 13 pages.

"Chaska wireless high speed internet access technologies—Chaska. net Fund". City of Chaska, State of Minnesota, 2011 Budget, Dec. 20, 2010, 4 pages.

Cheng, et al. "Joint QoS multicast routing and channel assignment in multiradio multichannel wireless mesh networks using intelligent computational methods." Applied Soft Computing, 11 (2011), 12 pages.

(56) References Cited

OTHER PUBLICATIONS

Yu, et al. "Multi-Channel Assignment in Wireless Sensor Networks: A Game Theoretic Approach." Proceedings of the IEEE International Conference on Computer Communications(INFOCOM), 2010. 9 pages.

Zhou, et al. "Distributed scheduling scheme for video streaming over multi-channel multi-radio multi-hop wireless networks". IEEE Journal on Selected Areas in Communications, vol. 28, No. 3, Apr. 2010, 11 pages.

International Search Report dated Aug. 15, 2013 for International Application No. PCT/CN2013/000586, 2 pages.

* cited by examiner

SYSTEMS AND METHODS FACILITATING JOINT CHANNEL AND ROUTING ASSIGNMENT FOR WIRELESS MESH NETWORKS

CROSS-REFERENCE TO RELATED APPLICATION AND CLAIM OF PRIORITY

This application is a United States National Phase Application of, and claims priority to each of, PCT Application Number PCT/CN2013/000586 filed May 16, 2013, and titled "SYSTEMS AND METHODS FACILITATING JOINT CHANNEL AND ROUTING ASSIGNMENT FOR WIRELESS MESH NETWORKS" which claims priority to U.S. Provisional Patent Application No. 61/688,573, filed May 17, 2012, and titled "Distributed Joint Channel and Routing Assignment for Multimedia Wireless Mesh Networks," the entireties of which applications are hereby expressly incorporated herein by reference.

TECHNICAL FIELD

The disclosed subject matter relates generally to wireless mesh networks (WMNs) and, more particularly, to joint channel and routing assignment with consideration of traffic flow for WMNs.

BACKGROUND

A WMN is a communication network made up of radio nodes organized in a mesh topology. The WMN is typically self-organizable and self-configurable with the advantages of low cost, ease of deployment and/or high reliability. Due to these advantages, a WMN can have important commercial applications. For example, a WMN can be employed as community wireless network to provide broadband internet access to residential users.

A multi-radio multi-channel (MRMC) WMN is a multi-hop communication network made up of radio nodes (e.g., IEEE 802.11 radio nodes) that can transmit and/or receive data on different channels. For example, in an MRMC network, nodes can transmit and receive packets simultaneously by communicating with their neighbors via different orthogonal frequency channels. Hence, an MRMC WMN can achieve higher system throughput than a traditional single-channel single-radio WMN. As such, MRMC WMNs are of interest in academia and commercial sectors.

The throughput of an MRMC WMN can be largely affected by interference. Such interference can be caused or exacerbated by the channel and routing assignments in the MRMC WMN. Unfortunately, solving routing and channel assignment problems are complex. As a result, channel and routing assignments are typically performed separately as opposed to being performed jointly. In some conventional approaches to routing, a path between a source node and a destination node is routed via multiple hops. Many routing algorithms employ the shortest path first approach for assigning the route between the source node and the destination node. These algorithms consider the hop distance, expected transmission time and/or expected transmission count. Still other approaches perform channel assignment separate from routing assignment and then perform joint rate allocation and multipath routing, which results in high complexity and losses in computational efficiency. Other algorithms unfortunately either ignore the effect of traffic load on the interference of the network or are not adaptive to the changes of traffic load. Yet other algorithms require high-precision clock synchronization among the nodes. These algorithms require a selection of routing and channel according to the synchronized time slots, which is often impractical for reasons of cost in commodities. Further, numerous algorithms are limited by being centralized in nature and cannot be extended to a distributed environment. As such, systems, apparatus and methods that provide low-complexity joint channel and routing assignment considering traffic flow are desirable.

DETAILED DESCRIPTION

Figure 1:
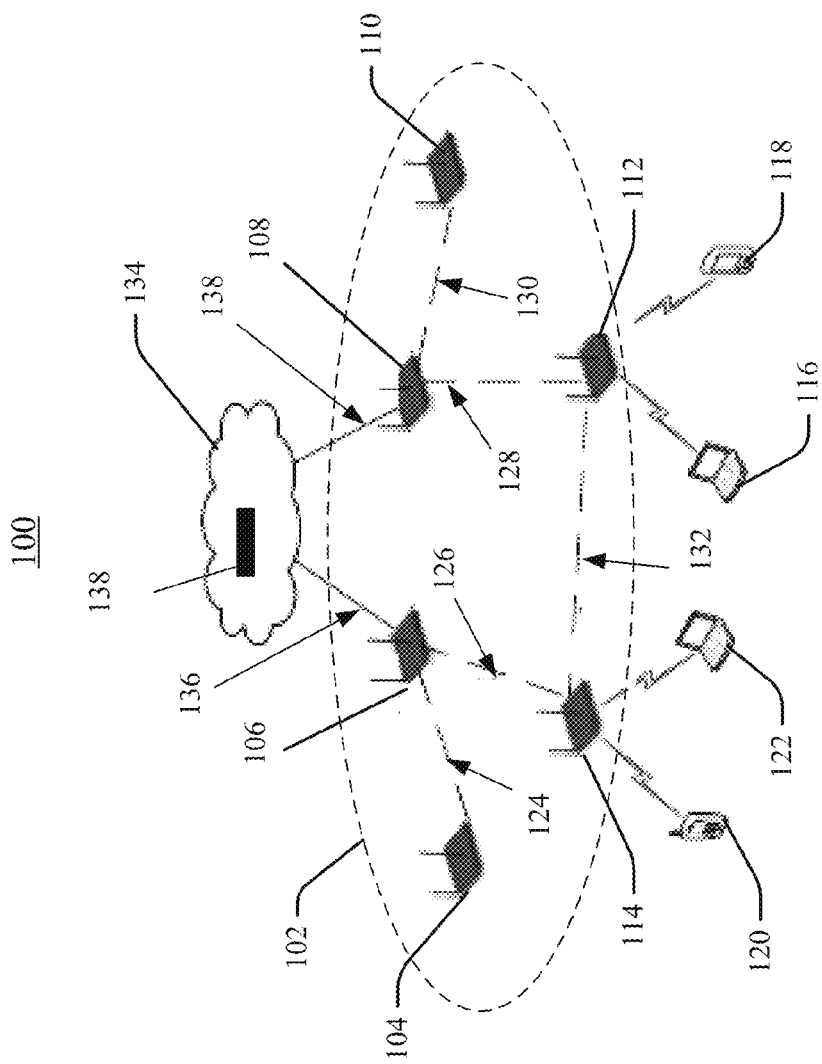
FIG. 1 is a schematic diagram of an exemplary non-limiting MRMC WMN in which joint channel and routing assignment with consideration of traffic flow (CRAFT) can be implemented in accordance with one or more embodiments described herein.

The following detailed description is merely illustrative and is not intended to limit embodiments or application and uses of embodiments. Furthermore, there is no intention to be bound by any expressed or implied theory presented in the preceding Technical Field or Background sections, or in the following Detailed Description section.

WMNs have been increasingly used to carry multimedia traffic with flow requirements. The performance of MRMC WMNs largely depends on the routing and channel assignment. Because routing and channel decisions are interdependent, assignments ideally should be jointly optimized to achieve the best performance. This is the so-called routing and channel assignment (routing and channel assignment) problem, which is known to be NP-hard. There has not been sufficient consideration on joint routing and channel assignment optimization which takes into account multimedia traffic demands in the network.

Due to the disadvantages of the foregoing, systems and methods that provide joint and distributed routing and channel assignment for ad-hoc networks are described herein. An objective function is designed that properly characterizes network throughput due to interference of traffic flows in the MRMC WMN to cooperatively and distributively improve network performance. As a result, optimization of the objective function can result in maximum throughput of the MRMC WMN. With the objective function, the routing and channel assignment can be optimized in a distributed and cooperatively manner.

Embodiments described herein include systems and methods facilitating joint CRAFT for MRMC WMNs. Joint CRAFT can be performed distributively employing only the nodes in an MRMC WMN for optimal joint CRAFT or, in some embodiments, centrally, employing a central controller that performs computations and communicate information to the nodes of the MRMC WMN for optimal joint CRAFT. Employing joint CRAFT-TP and/or joint CRAFT-RD, one or more embodiments described herein can optimize joint channel and routing assignment by continually improving the joint channel and routing assignment through message exchanges between the nodes of the MRMC WMN until the assignments across the network converge to a state that occurs at optimization of the objective function.

For example, in some embodiments, a method includes determining, by a first node having a processor and located in a network with a plurality of nodes, resulting joint channel and routing assignment information for the first node. The resulting joint channel and routing assignment information is determined based, at least, on a predefined condition associated with throughput due to interference of traffic in the network. In these embodiments, the node considers the throughput due to interference of traffic flow with various different channel and routing assignments and iteratively updates the joint routing and channel assignment information until an optimal value for the throughput is obtained. Joint CRAFT-TP and/or joint CRAFT-RD can be employed by the nodes. The joint routing and channel assignment associated with the optimal throughput given the traffic in the network is selected. This approach is a distributed solution employing information exchanged between one or more nodes in the network to result in a joint convergence across the network of a single set of joint channel and routing assignments for the network.

In another embodiment, an apparatus is provided. The apparatus includes a memory to store instructions; and a processor, coupled to the memory, that facilitates execution of the instructions to perform operations. The operations can include determining joint channel and routing assignment information based on information distributed between the apparatus and one or more of a plurality of nodes. For example, the apparatus and each node can individually determine joint channel and routing assignment information. Joint CRAFT-TP and/or joint CRAFT-RD can be employed by the nodes. The information can then be exchanged with other nodes and each node can iteratively update and exchange information until no node can further improve the value of the objective function in the network (e.g., MRMC WMN). The resulting set of joint channel and routing assignments is the set of information employed for traffic across the network.

In another embodiment, a system is provided. The system can include a plurality of nodes in a network (e.g., MRMC WMN). The nodes are configured to perform joint channel and routing assignment of traffic within the network based, at least, on a likelihood of increase in the value of the objective function. In some embodiments, the plurality of nodes are configured to perform distributed joint channel and routing assignment based on information iteratively exchanged between one or more of the plurality of nodes. Joint CRAFT-TP and/or joint CRAFT-RD can be employed by the nodes.

In the above-described embodiments, the nodes perform joint CRAFT in a distributed manner utilizing only the nodes in the network. In other embodiments, the nodes can perform joint CRAFT employing a central controller that can receive routing, channel, traffic and/or throughput information, perform computations to determine one or more sets of joint channel and routing assignments and provide the sets of assignments to one or more nodes. The process can be repeated to facilitate convergence of the network to an optimal set of joint channel and routing assignments.

One or more embodiments described herein can advantageously jointly optimize the routing and channel assignment in an MRMC WMN based on flow demands of nodes in the MRMC WMN. The embodiments can be employed in a distributed or centralized manner and are computationally efficient. Further, one or more embodiments of CRAFT-TP and/or CRAFT-RD can substantially improve system performance (e.g., convergence time, throughput, loss rate) over conventional approaches.

FIG. 1 is a schematic diagram of a network 100 including an exemplary non-limiting MRMC WMN 102 in which joint CRAFT can be implemented in accordance with one or more embodiments described herein. The network includes nodes, clients, links between nodes and links between nodes and clients, as well as additional networks, such as the internet. FIG. 1 is one mere example of a network and other examples of networks in which two or more nodes are connected to one another for distributed communication are envisaged.

MRMC WMN 102 includes nodes 104, 106, 108, 110, 112, 114 connected to one another and/or to respective clients 120, 122, 116, 118 by links 124, 126, 128, 130 136, 138. Internet 134 can also be included as part of MRMC WMN 102 to communicatively couple one or more of nodes 104, 106, 108, 110, 112, 114 to one another or to another network.

One or more channels can be associated with links 124, 126, 128, 130 136, 138 and, as such, nodes 104, 106, 108, 110, 112, 114 can determine routes between nodes in MRMC WMN 102 and channels over which communication on the links 124, 126, 128, 130 136, 138 can be conducted. In various embodiments, nodes 104, 106, 108, 110, 112, 114 can employ joint CRAFT via CRAFT-TP or CRAFT-RD for determining the routes and channel assignments.

In various embodiments, one or more of nodes 104, 106, 108, 110, 112, 114 are configured to transmit and/or receive information to and/or from one or more other nodes 104, 106, 108, 110, 112, 114. For example, the information transmitted and/or received can include, but is not limited to, audio, video, text, images, animation or interactive media.

As another example, the information transmitted and/or received can include, but is not limited to, routing assignment information, channel assignment information, joint CRAFT information (e.g., joint routing and channel assignments for a node), information indicative of whether a node is able to improve a value of the objective function by updating joint CRAFT information and/or information indicative of whether the node has converged to optimal joint CRAFT information.

In some embodiments, nodes 104, 106, 108, 110, 112, 114 can distributively converge on a joint CRAFT for the entire network by iteratively updating joint CRAFT information, exchanging the information with other nodes, and repeating this process until the node is unable to further improve the objective function while maintaining the joint CRAFT information received from other nodes.

In some embodiments, a central controller 138 can be communicatively coupled to the MRMC WMN to transmit and/or receive information to and/or from the nodes 104, 106, 108, 110, 112, 114 to facilitate a centralized approach to determination of a joint CRAFT solution for the entire MRMC WMN that optimizes the objective function. For example, the central controller 138 can receive joint CRAFT information from nodes 104, 106, 108, 110, 112, 114 and perform calculations for updating the joint CRAFT information for one or more of nodes 104, 106, 108, 110, 112, 114. The central controller 138 can transmit information to nodes 104, 106, 108, 110, 112, 114 for joint CRAFT information at nodes 104, 106, 108, 110, 112, 114.

Figure 2:
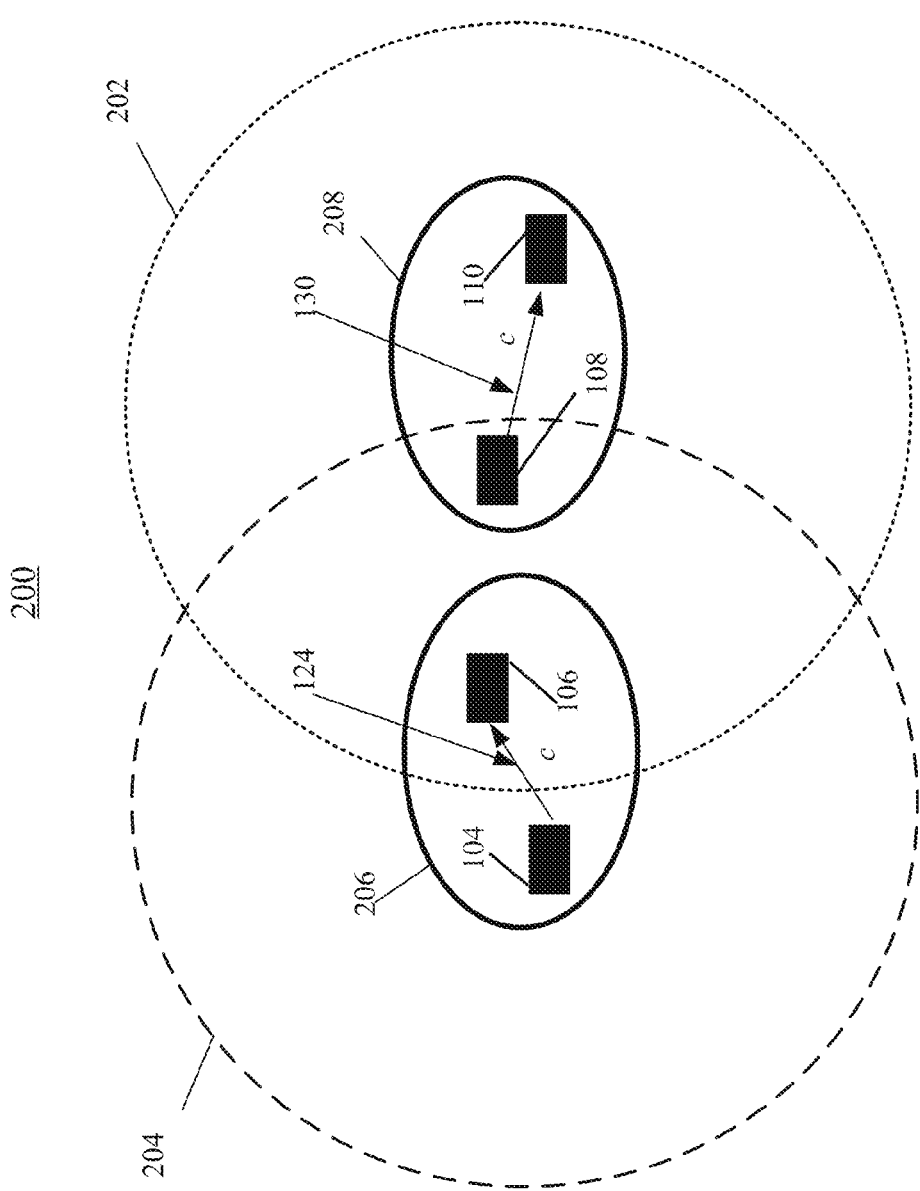
FIG. 2 is an exemplary non-limiting schematic diagram of interference in an MRMC WMN in which joint CRAFT can be employed in accordance with one or more embodiments described herein.
Figure 3:
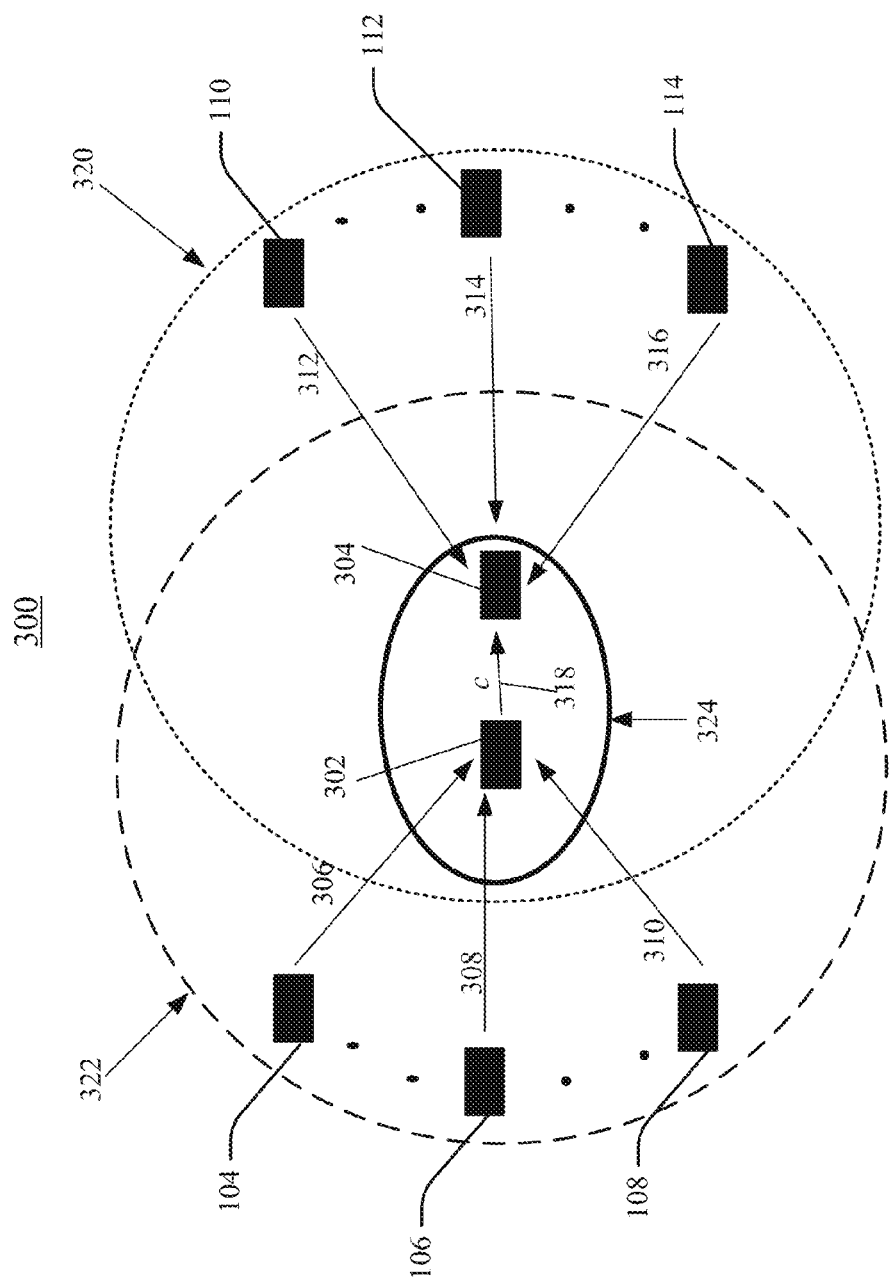
FIG. 3 is an exemplary non-limiting link interference model in which joint CRAFT can be employed in accordance with one or more embodiments described herein.

Details for deriving the objective function employed in the embodiments described herein are as follows with reference to FIGS. 1, 2 and 3. FIG. 2 is a schematic diagram of an exemplary non-limiting MRMC WMN in which interference exists and in which a CRAFT system can be implemented in accordance with one or more embodiments described herein. FIG. 3 is an exemplary non-limiting link interference model of a MRMC WMN in which a CRAFT system can be implemented in accordance with one or more embodiments described herein.

Variously referencing FIGS. 1, 2 and 3, MRMC WMN 102 can be modeled as a directed topology graph G(V,E), where V is the set of nodes 104, 106, 108, 110, 112, 114 and E is the set of links 124, 126, 128, 130 136, 138 in MRMC WMN 102. The communication radius of a node (e.g., node 104) is denoted as $r_C$, while the interference radius of a node is denoted as $r_I$, where $r_I = q \times r_C$ (q>1) The variable, q, is the interference factor as compared with communication radius. For example, if the communication range is r, the interference range is qr. In various embodiments, q can equal any number of different values. In some embodiments, for example, in the simulations described herein, q=2.

A link (e.g., link 124) between nodes 104, 106 can exist if nodes 104, 106 are within the communication radius of one another. Link 124 between nodes 104, 106 and link 130 between nodes 108, 110 can interfere with one another in various instances based on channel usage and location of nodes associated with a potentially interfering link. For example, link 124 can interfere with link 130 if links 124, 130 are using the same channel for communication and if node 104 or node 106 is located in the interference radius of either or both nodes of the other link.

Node 104 is communicating with node 106 over link 124, which is assigned channel c, while node 108 is communicating with node 110 over link 130, which is also assigned channel c. The communication range between nodes 104, 106 is range 206 and the communication range between nodes 108, 110 is range 208. The interference range 202 of node 108 and the interference range 204 of node 106 are shown. Interference exists between link 124 and link 130 since both links 124, 130 use channel c and node 106 is located in the interference range of node 108.

Each of nodes 104, 106, 108, 110 has one or more radio transceivers. The radio transceivers can be tuned to a particular channel for transmission and/or reception of data. The wireless spectrum over which nodes 104, 106, 108, 110 can transmit and/or receive data includes at least H orthogonal channels, and C represents the set of these orthogonal channels. Each radio of nodes 104, 106, 108, 110 can be assigned a unique channel such that no two radios of nodes 104, 106, 108, 110 are assigned the same channel. In these embodiments, R<H. Unlike approaches employed in conventional systems, the embodiments herein assume that the nodes 104, 106, 108, 110 can locate in multi-collision domain in which the nodes 104, 106, 108, 110 can generate data and/or route the data for nodes.

To analyze the interference of MRMC WMN 200, traffic flow demands are assumed to exist between pairs of nodes in MRMC WMN 200. As described above, transmission from node 104 can experience interference from node 108 if node 108 is in interference range 204 of node 104, and concurrently transmitting a packet on the same channel as the channel on which node 104 is transmitting. If node 104 and node 108 are both concurrently transmitting packets on the same channel, the transmission of the node 104 may not be successful. In these embodiments, for simplicity, substantially equal transmission power can be assumed for the transmissions of nodes 104, 108.

Assume node 104 is represented as node i and node i is using channel c. The set of nodes in the interference radius of node i (e.g., the set of nodes in radius of area 204), can be presented as I(i). If |.| represents the cardinality of a set, and |I(i)|=n, $x_j^c$ indicates whether channel c∈C is in use at node j (e.g., node 108) at time A, where j∈I(i). Then $x_j^c$ can be represented as shown in Equation (1):

$$x_j^c = \begin{cases} 1, & \text{if channel } c \text{ is in use at node } j \text{ at the moment} \\ 0, & \text{otherwise.} \end{cases} \quad (1)$$

If $f_j^c$ is the total traffic in channel c at node j at the moment, and K is the transmission capacity of channel c, then the probability that node j is using channel c is given by $p_j^c = f_j^c/K$. Further, if $X_i^c = (x_1^c, x_2^c, \ldots, x_j^c, \ldots, x_n^c)$ is the event vector indicating which nodes in the interference range of node i are using channel c, by independence assumption, the probability that $X_i^c$ occurs can be written as shown in Equation (2):

$$P(X_i^c) = \prod_{j=1}^{n} P(x_j^c). \qquad (2)$$

For example, in the interference range of node i, there can be any number of nodes. In this example, we assume four nodes. The four nodes are using channel c with traffic of 0.5 Mbps, 2 Mbps, 1 Mbps and 1.75 Mbps, respectively. If the link capacity K is 11 Mbps, the corresponding $P(x_j^c = 1)$ is shown Table 1 below. Accordingly, as shown, the likelihood that a node is in the interference range of a first node increases with an increase in traffic load from the node.

TABLE 1

| Node | 1 | 2 | 3 | 4 |
|---|---|---|---|---|
| $P(x_j^c = 1)$ | 0.045 | 0.182 | 0.091 | 0.159 |
| Traffic Load | 0.5 Mbps | 2 Mbps | 1 Mbps | 1.75 Mbps |

There are $2^4$ combinations of $X_i^c$ with corresponding probabilities. $X_i^c = (x_1^c, x_2^c, x_3^c, x_4^c) = (1,0,0,0)$ means node 1 is using channel c while nodes 2, 3 and 4 are not using channel c. Thus, $P(X_i^c = (1,0,0,0)) = 0.045 \times 0.818 \times 0.909 \times 0.841 = 0.0281$. Accordingly, a higher traffic load at node j on channel c leads to a higher probability of interference between node j and node i. Since the traffic load on a link between two nodes depends on the routing assignment, channel assignment and routing assignment can be jointly determined to minimize system interference.

Turning to FIG. 3, nodes 104, 106, 108, 110, 112, 114, 302, 304 are shown. A channel can be assigned for each link in the MRMC WMN 300 and traffic can be allocated on the channel according to various parameters to maximize throughput in MRMC WMN 300. FIG. 3 is one mere example of a manner in which nodes and links between nodes can be allocated. Nodes 104, 302 communicate over link 306, nodes 106, 302 communicate over link 308, nodes 108, 302 communicate over link 310, nodes 110, 304 communicate over link 312, nodes 112, 304 communicate over link 314, nodes 114, 304 communicate over link 316 and nodes 302, 304 communicate over link 318. Node 302 has interference range 322 while node 304 has interference range 320.

The probability of a successful transmission and/or reception of data is a function of the interference in the MRMC WMN 300. The interference can be divided into two different segments for edge (i,j)∈E. The first segment of interference can be interference at the transmitter node i (e.g., node 302) due to the interference by the nodes in I(i) using the same channel as (i,j) (e.g., channel 318). The second segment of interference can be at the receiver node j (e.g., node 304) due to the interference of nodes in I(j).

The link 318 can be assigned channel c. If any nodes from a to b (e.g., nodes 104, 106, 108) transmit traffic on channel c, such transmitting node is likely to interfere with the transmission from node i (e.g., node 302). Similarly, nodes u to v (e.g., nodes 110, 112, 114) are likely to interfere with the receipt of data at node j (e.g., node 304).

The probability of successful transmission on a link is closely related to the signal-to-interference plus noise ratio (SINR), which can be as denoted as shown in Equation (3):

$$SINR(i, c) = \frac{\Theta(i, i, c)}{\sum_{k \in I(i), k \neq i} \Theta(k, i, c) + \Delta}, \qquad (3)$$

where $\Theta(k,i,c)$ is the signal strength of node k at node i using channel c, and, thus, the interference from node k at node i due to the use of channel c by node k and node i. $\Delta$ is the background noise constant.

In some embodiments, each state $X_i^c$ mentioned has a SINR value at node i given by Equation (4):

$$SINR(i, X_i^c) = \frac{\Theta(i, i, c)}{\sum_{k \in I(i), k \neq i} (x_k^c \cdot \Theta(k, i, c)) + \Delta}. \qquad (4)$$

Using conditional probability, the SINR at transmitter node i, denoted by $SINR_{se}$, can be written as shown in Equation (5):

$$SINR_{se}(i, c) = \sum_{X_i^c} P(X_i^c) \cdot SINR(i, X_i^c). \qquad (5)$$

The SINR at receiver node j, denoted as $SINR_{re}(i,j,c)$, can be calculated similarly by replacing the $\Theta(i,i,c)$ in Equation (4) with $\Theta(i,j,c)$ where $\Theta(i,j,c)$ is the signal strength of node i at node j using channel c. The probability of successful transmission for link (i,j) is related to the SINR at the sender node i and the receiver node j, which is defined by Equation (6):

$$P(i,j,c) = \Psi(SINR_{se}(i,c), SINR_{re}(i,j,c)), \qquad (6)$$

where $\Psi$ is a monotonically function of $SINR_{se}(i,c)$ and $SINR_{re}(i,j,c)$ that maps SINR of link (i,j) to the probability of successful transmission of the link. From Equations (2), (4), (5) and (6), the probability of a successful transmission over a link depends on the routing and channel assignment.

If the traffic demands between the set of source and destination nodes is denoted as matrix, F, in which $f_{ab} \in F$ is the traffic demand from nodes a to node b (e.g., from node 104 to node 108), the routing path from a to b (from node 104 to node 108) can be denoted as $path_{ab}$. If a routing and channel assignment decision of the network is denoted as s, the successful transmission traffic, given the traffic demand F can be characterized as the utility of the s routing and channel assignment decision. Such utility can be denoted as U(s) and is as shown in Equation (7):

$$\max_{s} U(s) = \sum_{f_{ab} \in F} \left( f_{ab} \cdot \prod_{(i,j) \in path_{ab}} P(i, j, s) \right). \qquad (7)$$

In these embodiments, the joint channel assignment and routing problem in a MRMC WMN is solved by maximizing the throughput of the MRMC WMN in view of interference from traffic flows. Maximization of the throughput due to interference of traffic flows can be performed by maximizing the objective function, U(s), which is shown in Equation 7.

Figure 4:
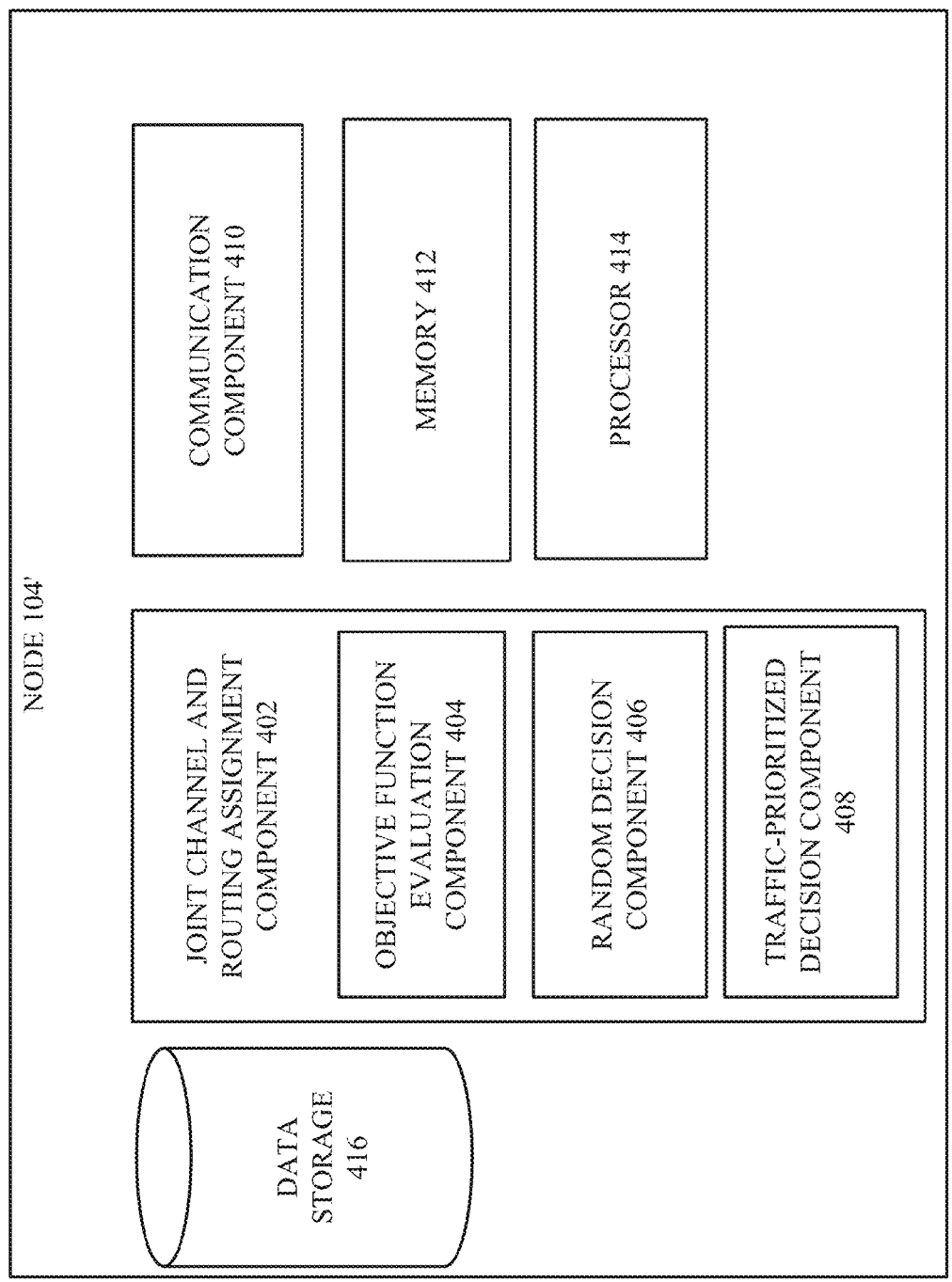
FIG. 4 is a block diagram of an exemplary non-limiting node within an MRMC WMN that can perform joint CRAFT in accordance with one or more embodiments described herein.

The nodes of the MRMC WMNs can include the structure and/or functionality described with reference to FIGS. 4, 5 and/or 6. FIG. 4 is a block diagram of an exemplary non-limiting node (e.g., node 104') within an MRMC WMN that can perform joint CRAFT in accordance with one or more embodiments described herein.

Node 104' can include a joint channel and routing assignment component 402, communication component 410, memory 412, processor 414 and/or data storage. The joint channel and routing assignment component 402, communication component 410, memory 412, processor 414 and/or data storage can be electrically and/or communicatively coupled to one another to perform the joint routing and channel assignment described herein. In some embodiments, as shown, the joint channel and routing assignment component 402 can include an objective function evaluation component 404, random decision component 406 and/or traffic-prioritized decision component 408.

The joint channel and routing assignment component 402 can determine joint CRAFT information at node 104'. Joint CRAFT information can include, but is not limited to, information indicative of a next hop node for each destination in the MRMC WMN, and a corresponding channel over which communication between node 104' and the next hop node can occur. Table 2 illustrates sample joint CRAFT information of node 104'.

TABLE 2

| Routing Decision | | |
|---|---|---|
| Destination Node | Next hop Node | Channel Decision Channel |
| $\alpha_1$ | $\beta_1$ | $c_1$ |
| . | . | . |
| . | . | . |
| . | . | . |
| $\alpha_{N-1}$ | $\beta_{N-1}$ | $c_{N-1}$ |

In Table 2, $\alpha_j$ is the destination node of the incoming flow. $\beta_j$ is the next hop node towards the destination node, and $c_j$ is the channel assigned to the outgoing link between the node and the next hop node. N represents the number of nodes in the MRMC WMN.

To initialize the information in Table 2 at system startup, joint channel and routing assignment component 402 can determine routing paths for each destination node of he MRMC WMN through the use of a link state routing protocol. For example, open shortest path first (OSPF) or any number of other different types of link state routing protocols can be employed. Joint channel and routing assignment component 402 can randomly assigned channels for each link between node 104' and the next hop nodes. Each node in the MRMC WMN can employ this process for generating initial joint CRAFT information.

After the routing and channel assignment decision table is formed, communication component 410 can distribute the joint CRAFT information to one or more of the nodes in the MRMC WMN. In some embodiments, communication component 410 can distribute the joint CRAFT information to each node in the MRMC WMN. Additionally, although communication component 410 can be configured to transmit and/or receive joint CRAFT information between node 104' and other nodes in the MRMC WMN in which node 104' is located, communication component 410 can also be configured to transmit and/or receive other types of information. For example, communication component 410 can be configured to transmit and/or receive data and other types of traffic (e.g., multimedia traffic) to and/or from node 104' and other nodes in the MRMC WMN.

Similarly, to node 104', one or more (or each) of the nodes in the MRMC WMN can distribute joint CRAFT information generated by the one or more (or each) of the nodes to one or more (or each) of the nodes in the MRMC WMN. The joint CRAFT information of all of the nodes forms the initial joint CRAFT information for the entire MRMC WMN.

The nodes can be notified that the initial CRAFT information for the entire MRMC WMN has been formed in any number of ways including, but not limited to, receiving a message from each node in the MRMC WMN including information providing notification that the node has distributed initial joint CRAFT information to each node in the MRMC WMN. Upon receipt of notification from each node in the MRMC WMN, a node can determine that the initialization stage has been completed and the initial joint CRAFT information has been generated for the entire MRMC WMN.

After the initial CRAFT information for the entire MRMC WMN is formed, joint channel and routing assignment component 402 can wait a random period of time and then compute an updated joint CRAFT information using CRAFT-RD or CRAFT-TP approaches. Each node can similarly begin updating initial joint CRAFT information generated by the node upon waiting a random period of time after the initial CRAFT information for the entire MRMC WMN is formed. For example, joint channel and routing assignment component 402 can update the initial joint CRAFT information.

Specifically, in various embodiments, each node iteratively determines updated joint CRAFT information, and distributes the updated to one or more (or each) node in the MRMC WMN. In some embodiments, the nodes each wait a random amount of time after distributing each updated joint CRAFT information and then re-determines another updated set of joint CRAFT information.

The objective function evaluation component 404 can compute a value of the objective function employing the updated joint CRAFT information. As such, the objective function evaluation component 404 can determine the value of the objective function using the updated joint CRAFT information.

The objective function evaluation component 404 can output a signal indicating whether the value of the objective function can be improved with the updated joint CRAFT information. Joint channel and routing assignment component 402 can receive the signal and adopt the joint CRAFT information if the updated information results in an improved objective function over past objective functions, and forego updating the joint CRAFT information if the updated information would not result in an improved objective function value. In the case of the first updated joint CRAFT information generated, the joint channel and routing assignment component 402 can adopt the joint CRAFT information regardless of the resulting objective function value. Updating and distributing of joint CRAFT information continues by one or more of the nodes until no nodes are able to further improve the value of the objective function utilizing updated joint CRAFT information.

The nodes select, as resulting CRAFT information, information that maximizes the objective function U(s) without changing the joint CRAFT information generated by the other nodes in the MRMC WMN. When no node can improve U(s), the joint CRAFT for each node has converged to a steady state and the method of determining joint CRAFT ends.

An example of the process of computing joint CRAFT information such as that shown in Table 2 is as follows. A node updates each next hop node information and corresponding channel information between the node and the next hop node in the decision table for the node. To determine the information for the updates, the node can employ the joint CRAFT information received from the other nodes in the WMN. A new decision table, or graph, is then formed for the node. The node then employs the objection function shown in Equation 7 to determine the amount of data that can be transmitted employing the joint CRAFT information. Employing Equation 7, the node generate a sum of the products of the successful transmission amounts, $f_{ab}$, and the estimated successful transmission rates. The estimated successful transmission rate is provided by Equation 6. The higher the value of the objective function, the larger the amount of data that can be transmitted. The amount of data that can be transmitted corresponds to the throughput and, as such, the higher the value of Equation 7, the higher the throughput associated with the joint CRAFT information in the decision table generated by the node.

Tables for all of the nodes including the resulting joint CRAFT information can be employed networkwide for all nodes. Accordingly, a steady state solution that optimizes the objective function (and accordingly, optimizes throughput due to interference from traffic flows in the network) is maximized.

Memory 412 can be a computer-readable storage medium storing computer-executable instructions and/or information for performing the functions described herein with reference to the node 104' and/or joint channel and routing assignment component 402. For example, the memory 412 can store computer-executable instructions for calculation of sample or current values of the objective function, determination of routing and/or channel information generated by the node at which memory 412 is located and/or for storage of routing and/or channel information generated by the other nodes in the MRMC WMN.

Processor 414 can perform one or more of the functions described herein with reference to the node 104' and/or joint channel and routing assignment component 402. For example, the processor 414 can facilitate determination of joint CRAFT information, computation of the value of the objective function and/or comparison and selection of values of objective functions.

The data storage 416 can be configured to store information transmitted to, received by and/or processed by the node 104' and/or joint channel and routing assignment component 402. In various embodiments, the data storage 416 can store information including, but not limited to, current or past joint CRAFT information, joint CRAFT information received from other nodes in the MRMC WMN, current or past values of the objective function, the objective function.

In various embodiments, the joint channel and routing assignment component 402 can generate updated joint CRAFT information in a number of different ways. For example, random decision component 406 can generate updated joint CRAFT information utilizing the CRAFT-RD method, and traffic-prioritized decision component 408 can generate updated joint CRAFT information utilizing the CRAFT-TP method.

In some embodiments, the random decision component 406 can be configured to randomly determine a sample routing assignment and a corresponding sample channel assignment. In some embodiments, a routing assignment and corresponding sample channel assignment is randomly selected for each destination node in the decision table for a particular node.

The random decision component 406 can adopt the sample routing assignment and corresponding sample channel assignment as an updated joint channel and routing assignment information if the updated joint CRAFT information would result in an improved value of the objective function. The random decision component 406 can repeat the process any number of times to determine whether combinations of routing and channel assignments results in an improved objective function value. If an improved objective function value results, the random decision component 406 can adopt the corresponding joint CRAFT information and the communication component 410 can transmit the joint CRAFT to one or more nodes in the MRMC WMN. The performance of the approach performed by the random decision component 406 is illustrated as joint CRAFT-RD in FIGS. 11-19.

In some embodiments, the traffic-prioritized decision component 408 can generate updated joint CRAFT information utilizing the CRAFT-TP method. For example, in some embodiments, the traffic-prioritized decision component 408 can select a sample routing assignment and a corresponding sample channel assignment. The sample routing assignment can include routing information identifying a next hop node in a route towards a destination node of the plurality of nodes. The destination node is deemed a high traffic node. The corresponding sample channel assignment includes channel information identifying a channel between the node and the next hop node. The channel selected can be a channel that is idle greater than a selected amount of time. As such, high traffic destination nodes can be assigned and routed first and the channel assigned can be one that is generally idle a large amount of time.

In particular, in some embodiments, in CRAFT-TP, the traffic-prioritized decision component 408 in a node can measure the amount of transmission data, or bitrate, intended for different destination nodes and arriving at the node. The traffic-prioritized decision component 408 of the node can then rank the destination nodes in descending order of the amount of transmission data. As such, the destination node with the largest amount of transmission data intended for the destination node via the node is ranked first.

The traffic-prioritized decision component 408 of the node can then iteratively, for each destination node, assign new joint CRAFT information such that a least interference value (according to Equation 7) results. For example, the traffic-prioritized decision component 408 of the node can iteratively, for each destination node, assign a new next hop node and corresponding channel such that a least interference value results. Accordingly, the traffic-prioritized decision component 408 of the node can perform the assignment by first assigning joint CRAFT information for the destination node ranked first and subsequently, in order, assigning new joint CRAFT information to other nodes, in descending order of the amount of transmission data intended for the destination node.

For example, the traffic-prioritized decision component 408 of the node can assign the best routing path and the most idle channel to the destination node having the largest amount of transmission data. In one or more embodiments, the best routing path can be determined in a number of different ways. For example, the best routing path between the node and any other node in the WMN can be based on a number of hops between the nodes, time delay for traffic to travel between the two nodes. In some embodiments, the links between two nodes can be assigned a weight value. The link can be the route between the two nodes. The weight value can be a function of delay time, average traffic and/or the number of hops between nodes. If there is more than one link between two nodes, the node determining the best routing path can select the link between the nodes that has the lowest weight.

The next best routing path and the next most idle channel can be assigned to the destination node having the next largest amount of transmission data. The process can continue iteratively until the entire set of destination nodes in the decision table for the node is assigned joint CRAFT information.

The objective function evaluation component 404 can calculate the interference value of the new joint CRAFT information. If the interference value of the new joint CRAFT information for the node is less than the interference value for the previous values of the joint CRAFT information for node, the new CRAFT information for the decision table of the node can be the updated joint CRAFT information and the updated CRAFT information in the decision table for the node can then be transmitted to neighboring nodes of the node.

As such, routing paths and channels for destination nodes with larger traffic load, and therefore larger probability of interfering with other destination nodes and traffic, are determined first. As such, the interference on the links for the destination nodes with larger traffic load can be minimized thereby minimizing the interference effect on the entire WMN, and improving overall performance in the WMN.

The complexities of joint CRAFT are analyzed in big-O as follows. If $|T(i)|=D$ is the average number of neighbors of each node, because $|X^c| \leq D$, the complexity of computing Equation 2 is $O(D)$. The possible value of $X^c$ is less than or equal to $2^D$. Thus, the complexity of computing Equations 5 and 6 is $O(2^D D)$. If there are P traffic flows in the network, since the maximum node hops of a path in an N node MRMC WMN is N−1, according to Equation 7, the complexity of computing U(s) is given by $O(2^D DPN)$.

CRAFT-RD and CRAFT-TP have low run-time complexity and the complexity analysis can be described as follows. For CRAFT-RD, in some embodiments, the algorithm requires computing and comparing the U(s) for the newly chosen decision only. Thus, the complexity of CRAFT-RD is $O(2^D DPN)$. For CRAFT-TP, in some embodiments, there are DH choices for each destination node and DH×(N−1) comparison steps, where H is the number of orthogonal channels. Therefore, the complexity of CRAFT-TP can be $O(2^D D^2 PN^2)$. In WMNs, the values of D and H are usually small. Hence, the complexity of CRAFT-RD and CRAFT-TP can be presented as $O(PN)$ and $O(PN^2)$, respectively.

Figure 5:
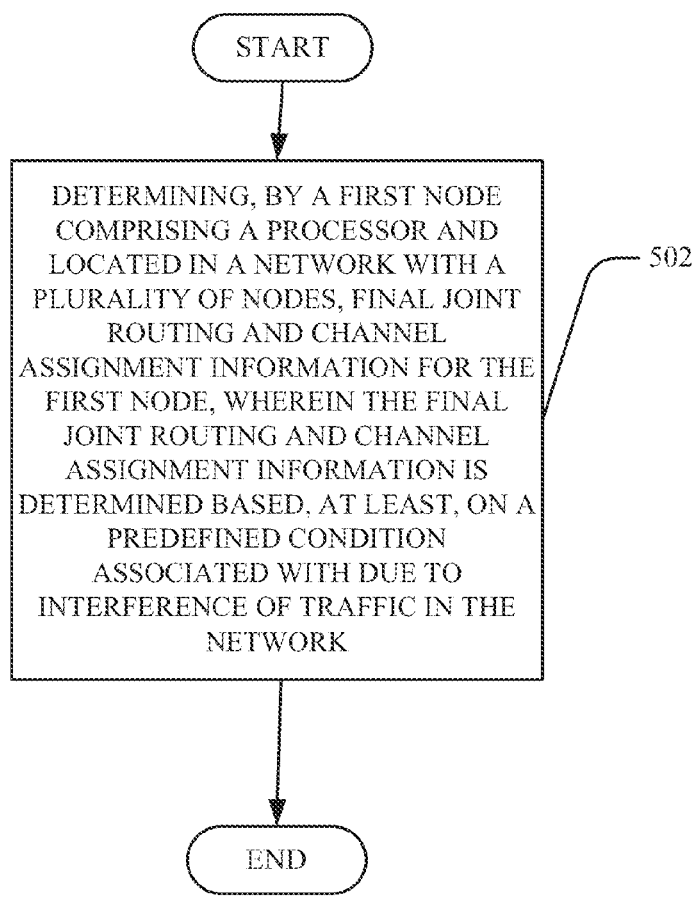
FIGS. 5, 6, 7, 8, 9 and 10 are exemplary non-limiting flowcharts of methods of operation of joint CRAFT systems in accordance with one or more embodiments described herein.

FIGS. 5, 6, 7, 8, 9 and 10 are exemplary non-limiting flowcharts of methods of operation of CRAFT systems in accordance with one or more embodiments described herein. Turning first to FIG. 5, at 502, method 500 can include determining, by a node in a network, resulting joint channel and routing assignment information for the node. The resulting joint channel and routing assignment information can be determined based, at least, on a predefined condition associated with throughput due to interference of traffic in the network.

For example, the predefined condition can be the likelihood of optimization of throughput due to interference from one or more traffic flows in the network being greater than a predefined value. In embodiments, the predefined condition can be met when there is a high likelihood (e.g., greater than 90% or greater than 97%) that the throughput is optimized. In some embodiments, a node determines whether throughput is optimized while maintaining (and therefore not changing) joint CRAFT information from the one or more of the plurality of nodes.

Figure 6:
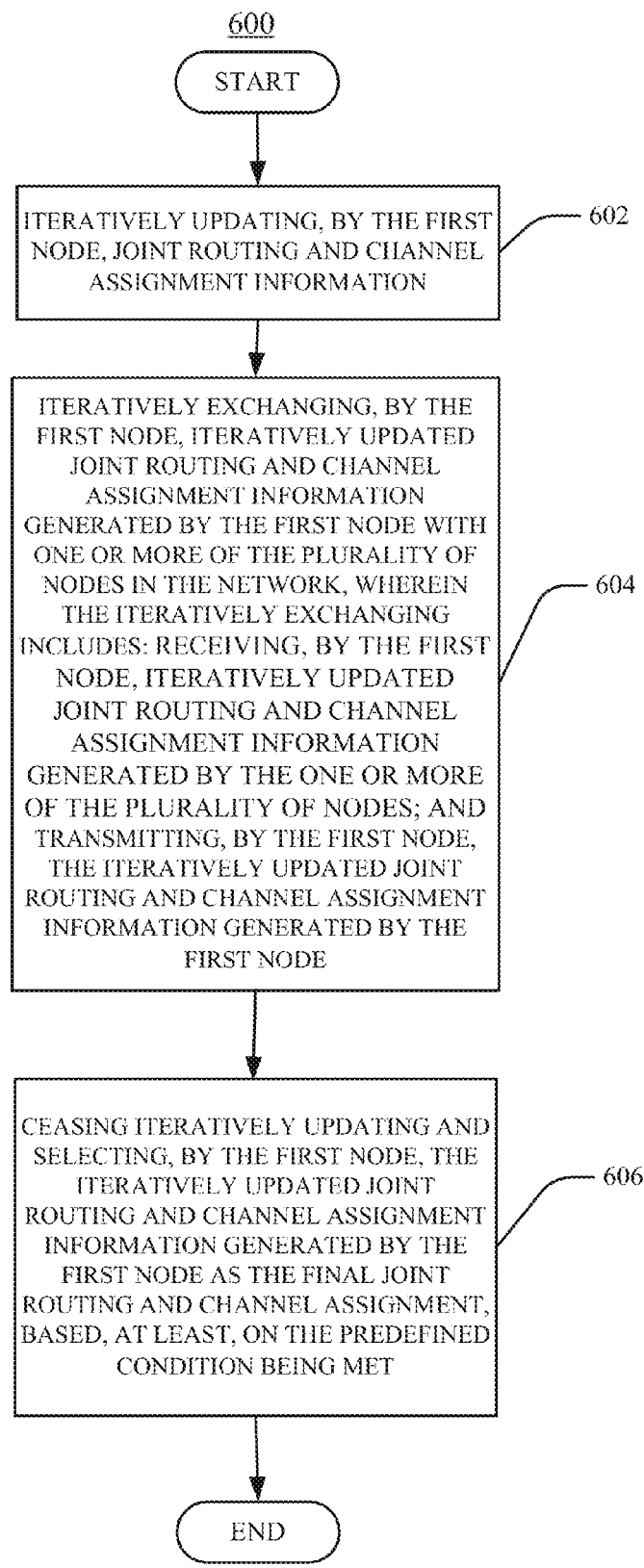

Turning now to FIG. 6, at 602, method 600 can include iteratively updating joint channel and routing assignment information. At 604, method 600 can include iteratively exchanging iteratively updated joint channel and routing assignment information generated by a first node with one or more of the plurality of nodes in the network. In some embodiments, iteratively exchanging includes receiving, by the first node, iteratively updated joint channel and routing assignment information generated by the one or more of the plurality of nodes. Iteratively exchanging can also include transmitting, by the first node, the iteratively updated joint channel and routing assignment information generated by the first node.

At 606, method 600 can include ceasing iteratively updating and selecting, by the first node, the iteratively updated joint channel and routing assignment information generated by the first node as the resulting joint channel and routing assignment, based, at least, on the predefined condition being met.

Figure 7:
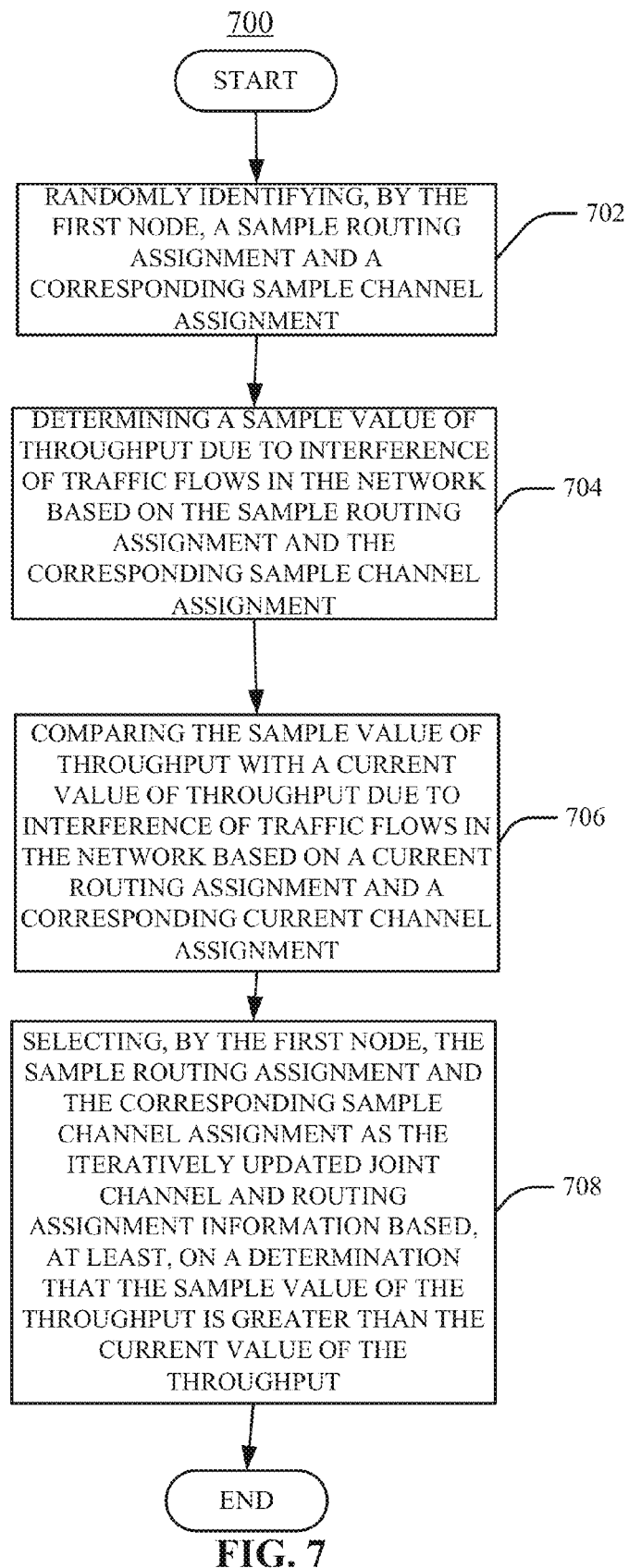

An example of CRAFT-RD method of iteratively updating the joint channel and routing assignment information can be as described and shown with reference to FIG. 7. At 702, method 700 can include randomly identifying, by the first node, a sample routing assignment and a corresponding sample channel assignment. At 704, method 700 can include determining a sample value of throughput due to interference of traffic flows in the network based on the sample routing assignment and the corresponding sample channel assignment. At 706, method 700 can include comparing the sample value of throughput with a current value of throughput due to interference of traffic flows in the network based on a current routing assignment and a corresponding current channel assignment. At 708, method 700 can include selecting, by the first node, the sample routing assignment and the corresponding sample channel assignment as the iteratively updated joint channel and routing assignment information based, at least, on a determination that the sample value of the throughput is greater than the current value of the throughput.

Figure 8:
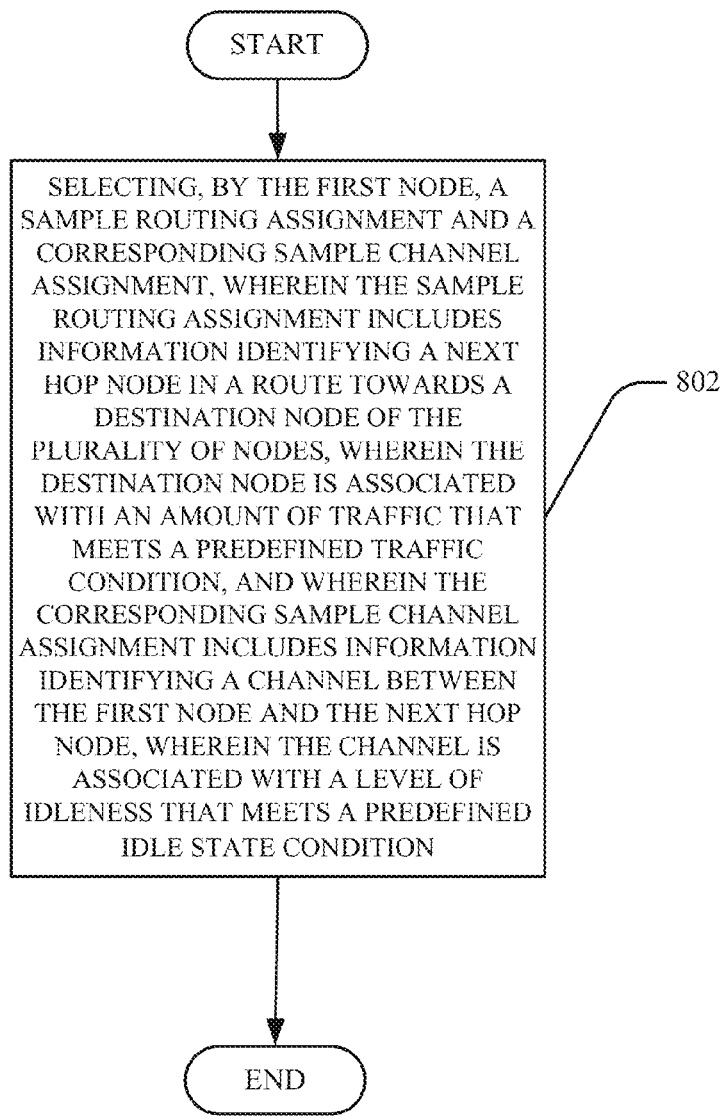

An example of a CRAFT-TP method of iteratively updating the joint channel and routing assignment information can be as described and shown with reference to FIG. 8. At 802, method 800 can include selecting, by the first node, a sample routing assignment and a corresponding sample channel assignment that include information identifying a next hop node in a route towards a high traffic destination node. The corresponding sample channel assignment can include information identifying a channel between the first node and the next hop node, wherein the channel is associated with a level of idleness that meets a predefined idle state condition. The predefined idle state condition can be an amount of time that the channel is idle is greater than a predefined amount. For example, a channel can be selected that is in an idle state for more than a predefined percentage of time.

Figure 9:
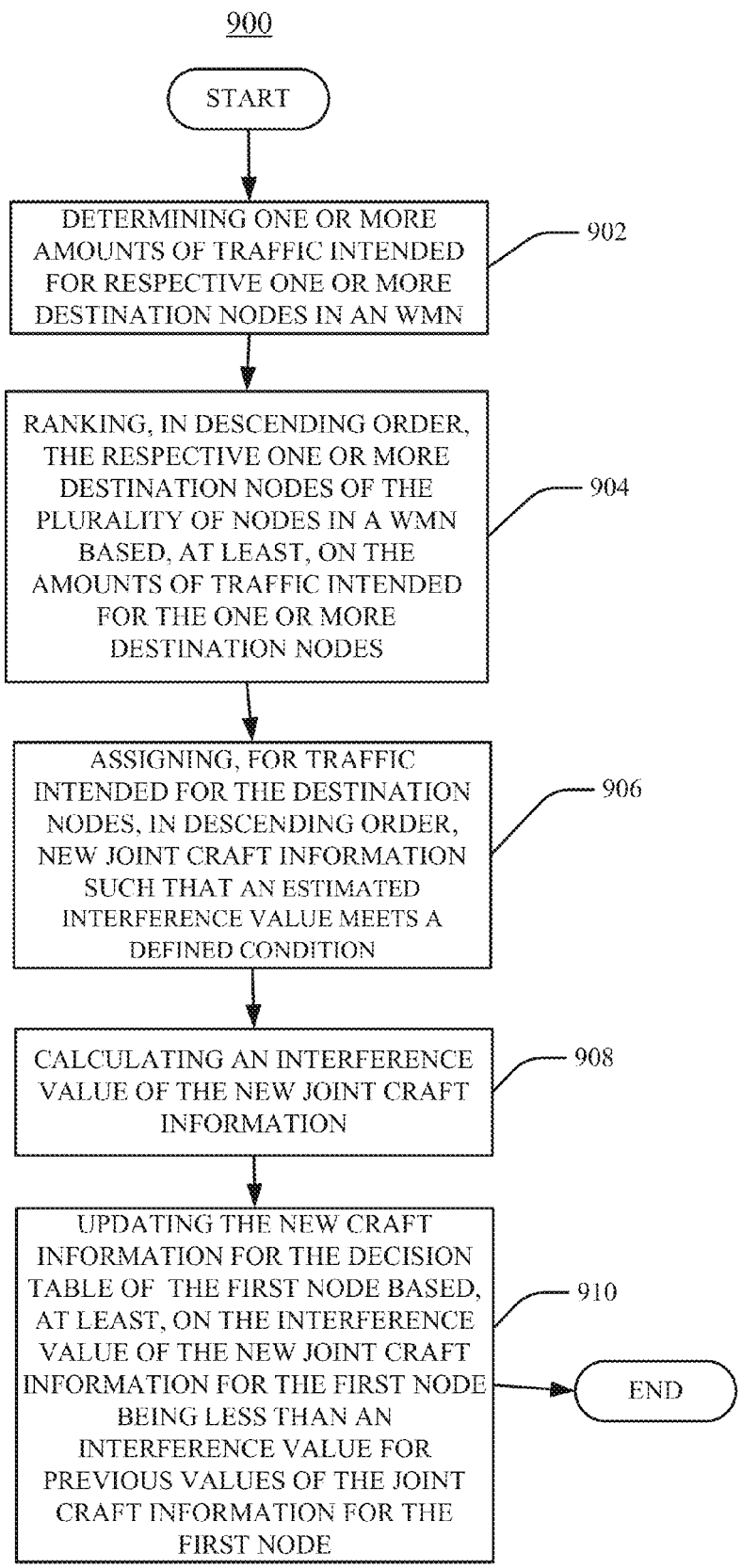

Another example of CRAFT-TP method of updating the joint channel and routing assignment information can be as described and shown with reference to FIG. 9. At 902, method 900 can include determining one or more amounts of traffic intended for respective one or more destination nodes in a WMN. At 904, method 900 can include ranking, in descending order, the respective one or more destination nodes of the plurality of nodes in a WMN based, at least, on the amounts of traffic intended for the one or more destination nodes.

At 906, method 900 can include assigning, for traffic intended for the destination nodes, in descending order, new joint CRAFT information such that an estimated interference value meets a defined condition. For example, the new joint CRAFT information can be determined such that least interference values result. In some embodiments, the best routing path and the most idle channel can be assigned to the destination node having the largest amount of transmission data. The next best routing path and the next most idle channel can be assigned to the destination node having the next largest amount of transmission data. The process can continue iteratively until the entire set of destination nodes in the decision table for the node is assigned joint CRAFT information.

At 908, method 900 can include calculating the interference value of the new joint CRAFT information. At 910, method 900 can updating the new CRAFT information for the decision table of the node based, at least, on the interference value of the new joint CRAFT information for the node being less than the interference value for the previous values of the joint CRAFT information for the node.

Figure 10:
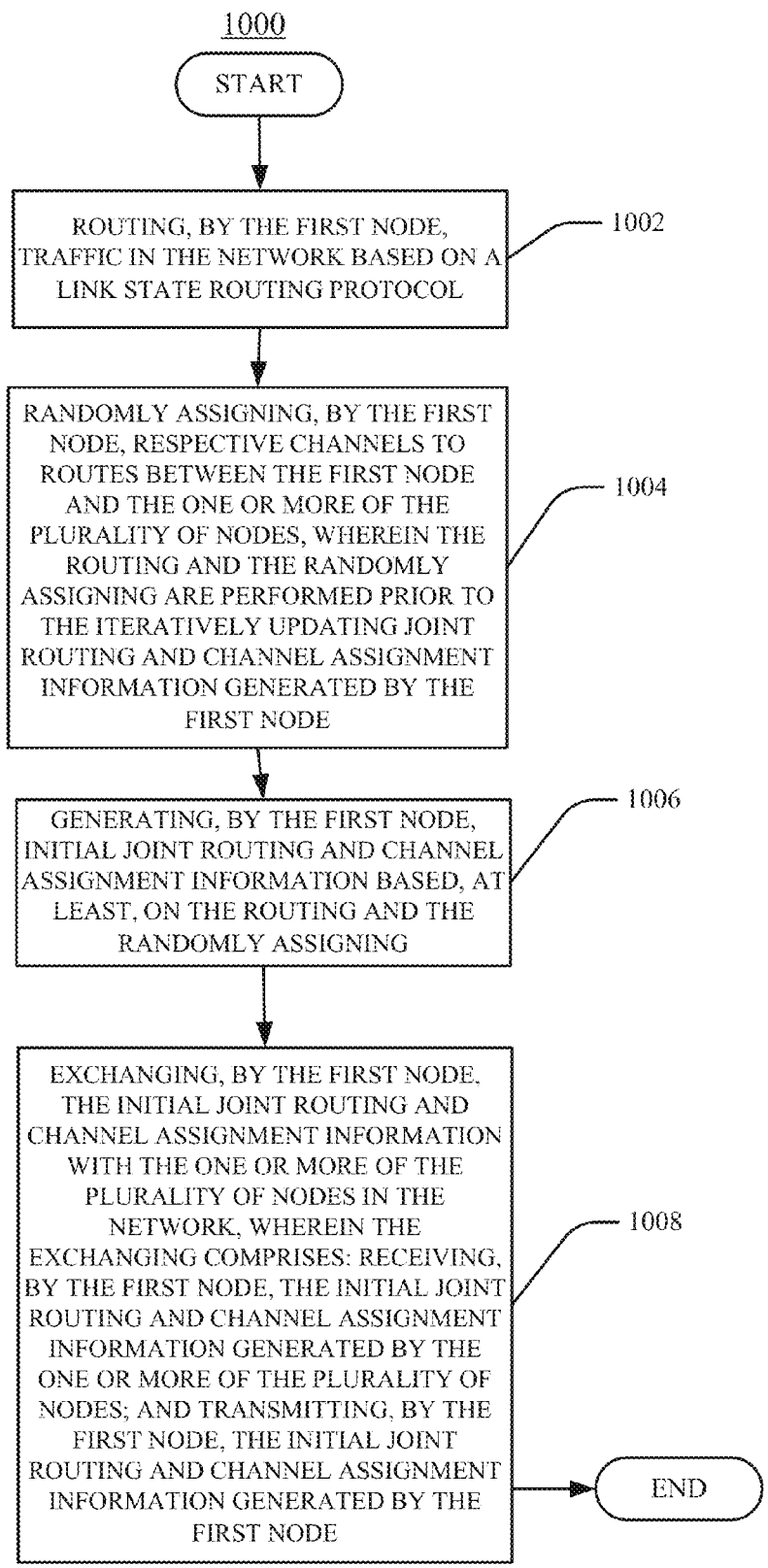

Turning now to FIG. 10, at 1002, method 1000 can include routing, by the first node, traffic in the network based on a link state routing protocol. At 1004, method 1000 can include randomly assigning, by the first node, respective channels to routes between the first node and the one or more of the plurality of nodes, wherein the routing and the randomly assigning are performed prior to the iteratively updating joint channel and routing assignment information generated by the first node.

At 1006, method 1000 can include generating, by the first node, initial joint channel and routing assignment information based, at least, on the routing and the randomly assigning. At 1008, method 1000 can include exchanging, by the first node, the initial joint channel and routing assignment information with the one or more of the plurality of nodes in the network. Exchanging can include receiving, by the first node, the initial joint channel and routing assignment information generated by the one or more of the plurality of nodes. Exchanging can also include transmitting, by the first node, the initial joint channel and routing assignment information generated by the first node.

Although not shown, in some embodiments, method 1000 can also include initiating, by the first node, the iteratively updating the joint channel and routing assignment information after a random period of time elapses after receipt of one or more initial joint channel and routing assignment information from the one or more of the plurality of nodes.

FIGS. 11-19 depict graphs showing simulations of performance of one or more embodiments of joint CRAFT-TP, joint CRAFT-RD and conventional approaches to routing and/or channel assignment in accordance in accordance with one or more embodiments described herein. The simulations detail the performance of joint CRAFT-TP and joint CRAFT-RD in terms of delay, loss rate and throughput. In the simulations, nodes are randomly dispersed throughout a 500 meter (m)×500 m area. The nodes operate according to IEEE 802.11b radio protocol.

The performance metrics in the simulation are as follows. For loss rate, user datagram protocol (UDP) traffic is injected into the WMN according to the traffic demands. The average loss rate of all the traffic flows at steady state is determined. For delay, UDP traffic is injected into the network according to the traffic demands. At steady state, the average end-to-end delay of all the successfully received packets is determined. For throughput, transmission control protocol (TCP) traffic is injected into the network according to the traffic demands. At steady state, the aggregated throughput of all the traffic flows is then measured. For convergence, the number of steps required to reach steady state is determined.

Unless otherwise stated, the following baseline parameters were employed in the simulations. Communication range is 120 meters (m), interference range is 240 m, 3 orthogonal channels are available, each node is equipped with 3 radio transceivers, traffic demand is 2 megabits per second (MBPS) per pair of nodes, total number of communication pairs is 10, carrier sense multiple access (CSMA) is enabled, and total number of nodes in the WMN is 20.

Joint CRAFT-TP and joint CRAFT-RD (noted as "CRAFT-TP and CRAFT-RD," respectively in FIGS. 11-19) are compared with a distributed routing and channel assignment scheme, J-CAR (Hon Sun Chiu, K. I. Yeung, and King-Shan Lui, "J-CAR: An efficient joint channel assignment and routing protocol for IEEE 802.11-based multi-channel multi-interface mobile ad hoc networks" *IEEE Transactions on Wireless Communications*, vol. 8, no. 4, pp. 1706-1715, April 2009), and game-based channel allocation (GBCA) (Qing Yu, Jiming Chen, Yanfei Fan, Xuemin Shen, and Youxian Sun, "Multi-channel assignment in wireless sensor networks: A game theoretic approach," in *Proceedings of the IEEE International Conference on Computer Communications (INFOCOM)*, March 2010-pp. 1-9).

J-CAR improved the Ad-hoc On-demand Distance Vector (AODV) protocol to do the routing and channel assignment in a distributed manner. The game-based scheme uses GBCA for channel assignment and shortest path first (SPF) for routing. Although GBCA was proposed for wireless sensor networks, the algorithm can be applied to WMNs.

Figure 11:
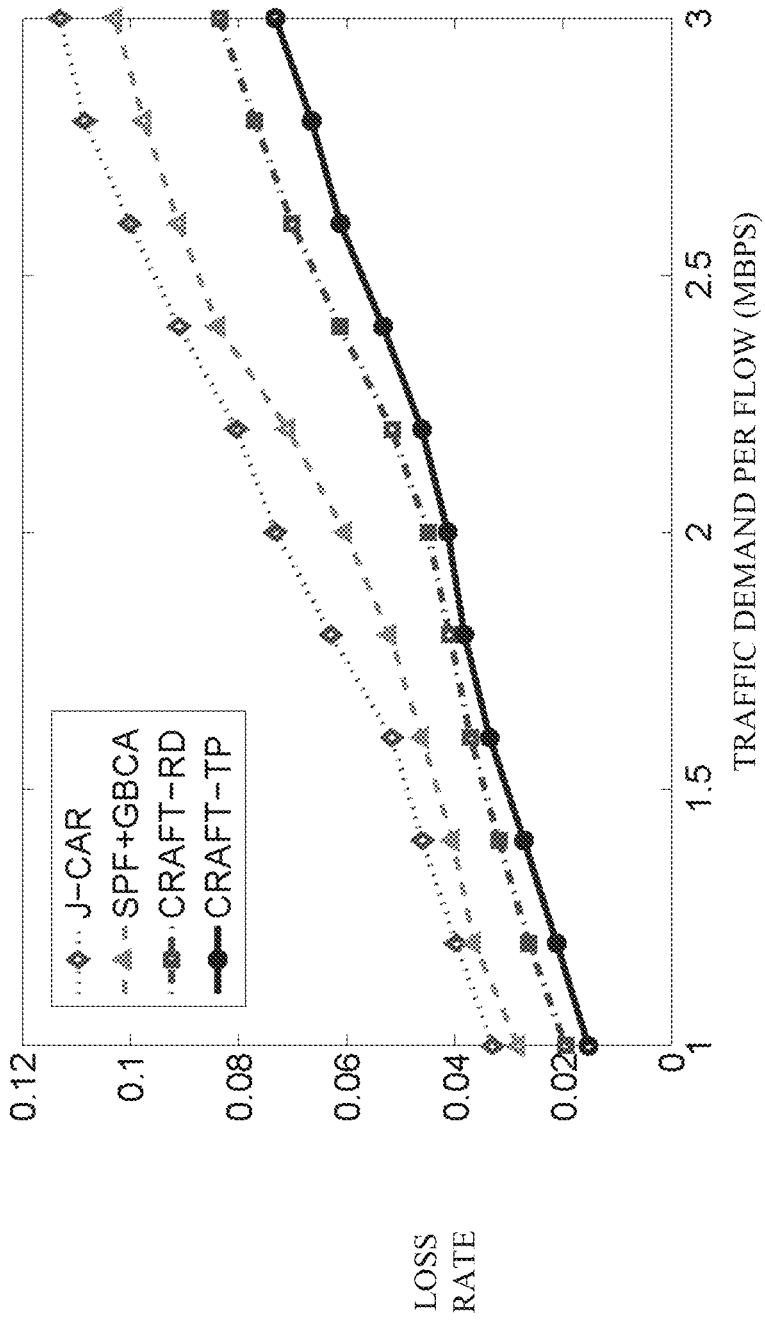
FIG. 11 is an exemplary non-limiting graph of loss rate versus traffic demand per flow employing joint CRAFT-TP, joint CRAFT-RD and conventional approaches to routing and/or channel assignment in accordance with one or more embodiments described herein.

Turning first to FIG. 11, the loss rate increases with increase in traffic demand because higher traffic demand leads to higher interference. From the low loss, it is shown that the traffic demands have been met. Joint CRAFT performs better than SPF+GBCA and J-CAR, and joint CRAFT-TP performs better than joint CRAFT-RD. This is because GBCA does not always converge while J-CAR is not adaptive to the changing traffic levels. These disadvantages can result in high interference leading to a higher loss rate than joint CRAFT. Joint CRAFT-TP is better than joint CRAFT-RD because joint CRAFT-TP can minimize the interference of the links that have heavy traffic, and thus, effectively reduce the probability of interference, hence the loss rate.

Figure 12:
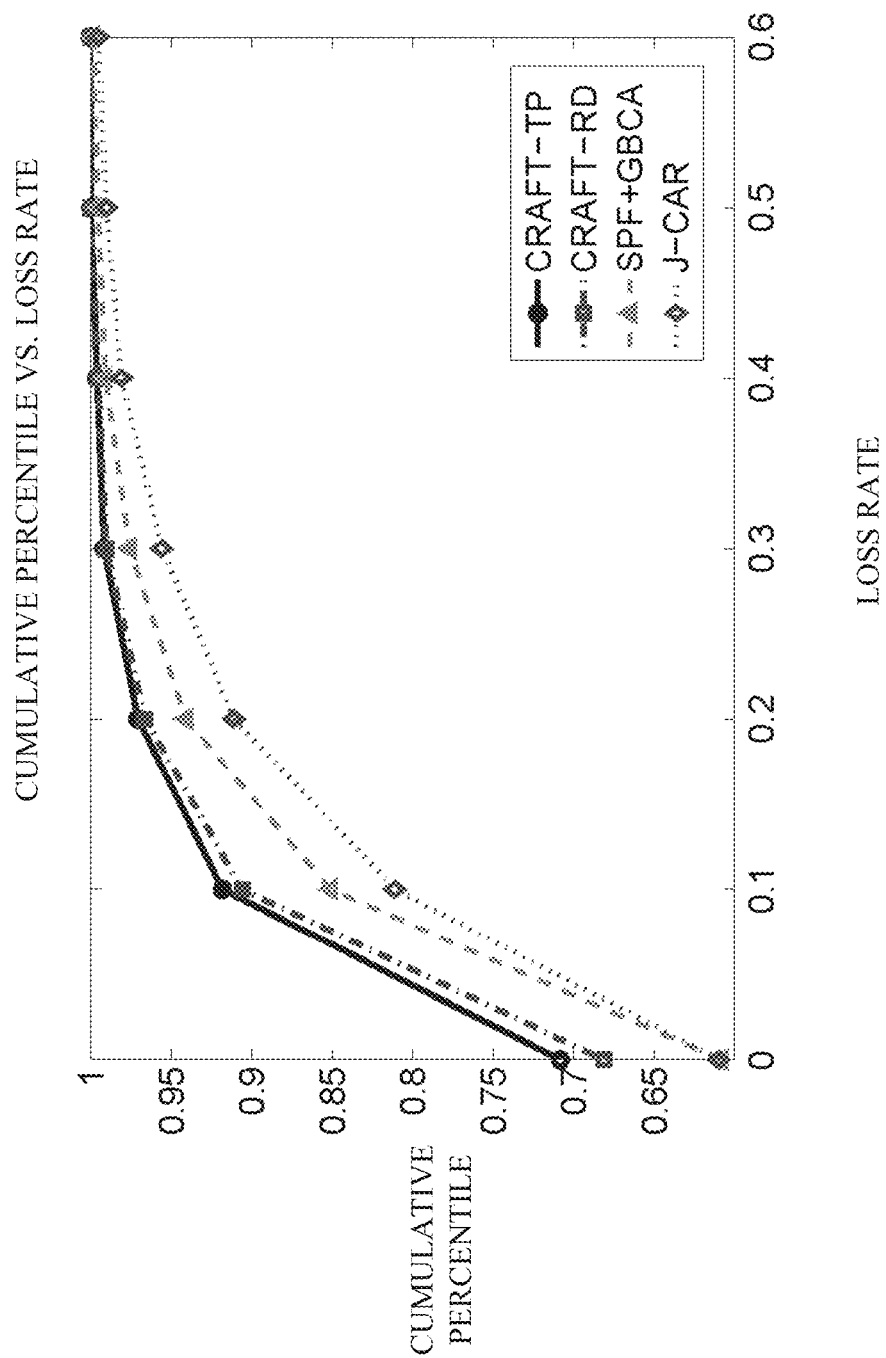
FIG. 12 is an exemplary non-limiting graph of cumulative percentile versus loss rate employing joint CRAFT-TP, joint CRAFT-RD and conventional approaches to routing and/or channel assignment in accordance with one or more embodiments described herein.
Figure 13:
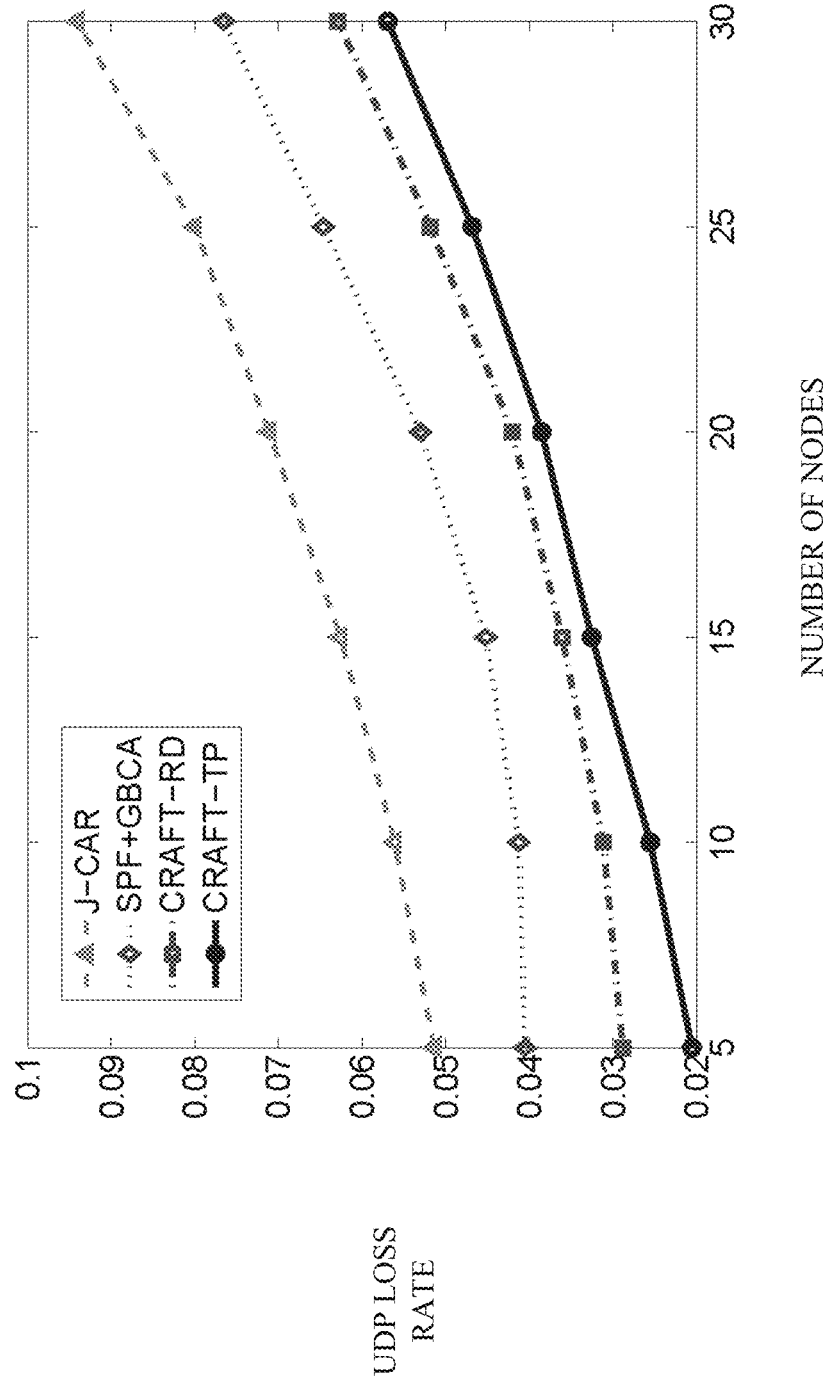
FIG. 13 is an exemplary non-limiting graph of cumulative user datagram protocol (UDP) loss rate versus number of nodes employing joint CRAFT-TP, joint CRAFT-RD and conventional approaches to routing and/or channel assignment in accordance with one or more embodiments described herein.

FIG. 12 is an exemplary non-limiting graph of cumulative percentile versus loss rate for joint CRAFT-TP, joint CRAFT-RD and conventional approaches to routing and/or channel assignment in accordance in accordance with one or more embodiments described herein. The cumulative percentiles versus loss rate in UDP given different schemes are shown in FIG. 13. The cumulative percentile is the percentage of traffic flows that are lower than the loss rate. Given a certain loss rate, the cumulative percentile of joint CRAFT is higher than the other two schemes, which means that more traffic flows using joint CRAFT have lower loss rates. This is because GBCA does not always converge while J-CAR is not adaptive to the changing traffic levels. These disadvantages can result in high interference leading to a higher loss rate than joint CRAFT. Joint CRAFT-TP is better than joint CRAFT-RD because joint CRAFT-TP can minimize the interference of the links that have heavy traffic, and thus, effectively reduce the probability of interference, hence the loss rate.

FIG. 13 is an exemplary non-limiting graph of cumulative UDP loss rate versus number of nodes for joint CRAFT-TP, joint CRAFT-RD and conventional approaches to routing and/or channel assignment in accordance in accordance with one or more embodiments described herein. The loss rates are low for a network with a small number of nodes because of lower interferences and number of hops among the nodes. The loss rate increases with the network size (and hence density) increase. Both joint CRAFT-TP and joint CRAFT-RD outperform the other schemes significantly due to the better routing and channel assignment in joint CRAFT-TP and joint CRAFT-RD.

Figure 14:
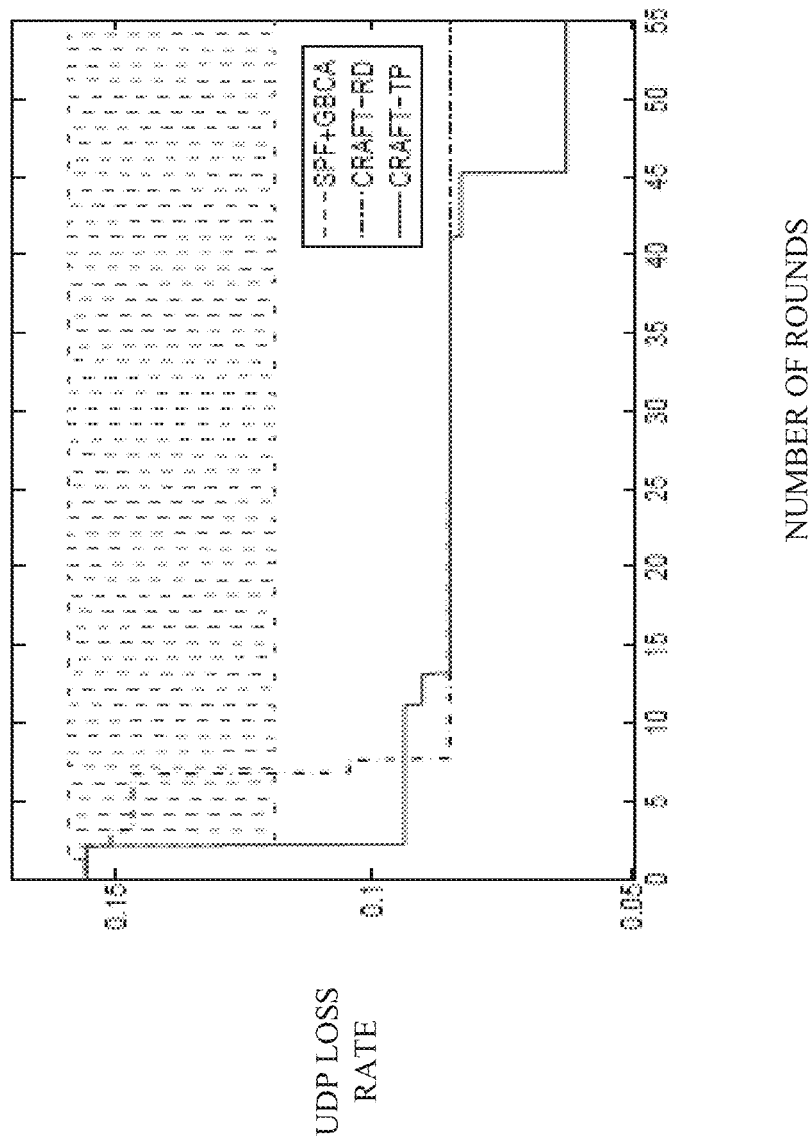
FIG. 14 is an exemplary non-limiting graph of cumulative UDP loss rate versus number of rounds employing joint CRAFT-TP, joint CRAFT-RD and conventional approaches to routing and/or channel assignment in accordance with one or more embodiments described herein.

FIG. 14 is an exemplary non-limiting graph of cumulative UDP loss rate versus number of rounds for joint CRAFT-TP, joint CRAFT-RD and conventional approaches to routing and/or channel assignment in accordance in accordance with one or more embodiments described herein. The convergence time of joint CRAFT-TP and joint CRAFT-RD is compared with the convergence time of SPF+GBCA. Convergence time is evaluated in terms of UDP loss rate. The average loss rate versus the number of rounds of each scheme is shown. Joint CRAFT converges after several rounds while SPF+GBCA has much worse convergence characteristics. Additionally, the convergence time of joint CRAFT-TP is shorter than joint CRAFT-RD. Specifically, the convergence time for joint CRAFT-TP is shorter than the convergence time for joint CRAFT-RD. Joint CRAFT-TP first optimizes the links with higher traffic demand, which can eliminate the main factor that will affect the interference, and joint CRAFT-TP can therefore converge faster than joint CRAFT-RD. When links that have a higher probability to interfere with each other are optimized first in each iteration, better convergence times can result.

Figure 15:
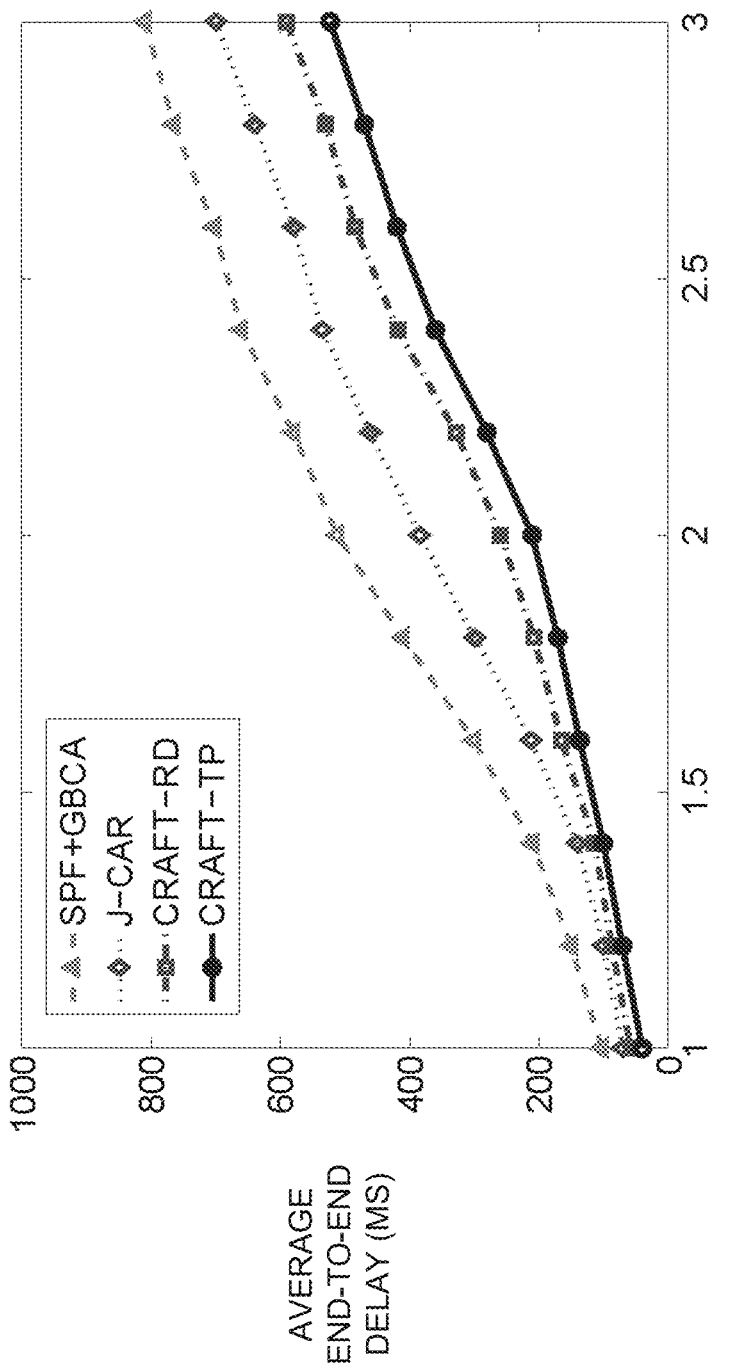
FIG. 15 is an exemplary non-limiting graph of average end-to-end delay versus traffic demand per flow employing joint CRAFT-TP, joint CRAFT-RD and conventional approaches to routing and/or channel assignment in accordance with one or more embodiments described herein.

FIG. 15 is an exemplary non-limiting graph of average end-to-end delay versus traffic demand per flow for joint CRAFT-TP, joint CRAFT-RD and conventional approaches to routing and/or channel assignment in accordance in accordance with one or more embodiments described herein. The end-to-end delay increases with the traffic demand because when a node detects transmissions by other nodes in the interference range, the node delays transmitting. Higher traffic demand then results in longer queuing delay for each packet at a node, which increases the end-to-end delay. Joint CRAFT performs better than J-CAR and SPF+GBCA because better channel assignment can reduce the queuing delay significantly. Joint CRAFT-TP performs better than joint CRAFT-RD because links with higher traffic will be assigned to an idler channel first. This reduces most of the packet queuing delay.

Figure 16:
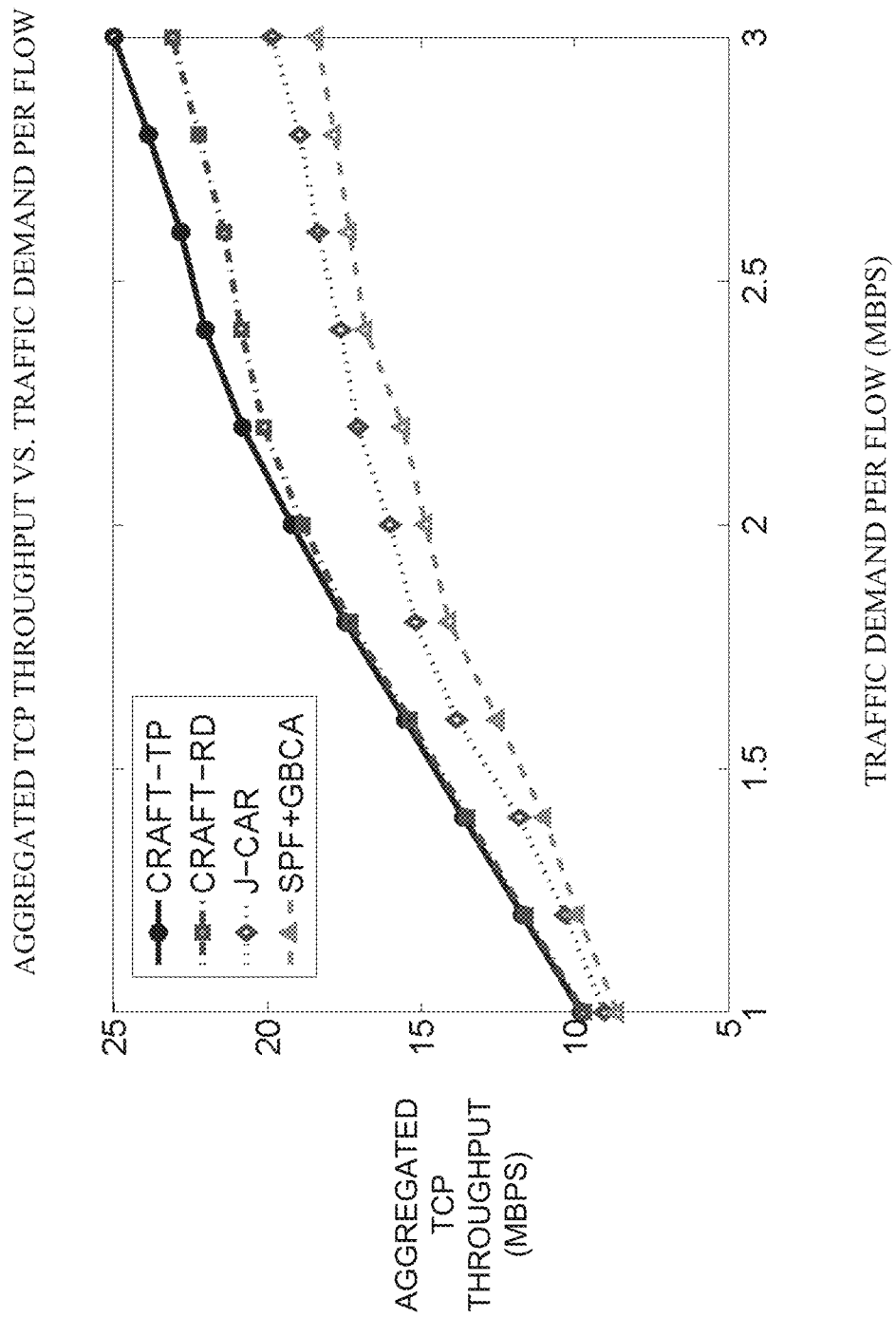
FIG. 16 is an exemplary non-limiting graph of aggregated transmission control protocol (TCP) throughput versus traffic demand per flow employing joint CRAFT-TP, joint CRAFT-RD and conventional approaches to routing and/or channel assignment in accordance with one or more embodiments described herein.

FIG. 16 is an exemplary non-limiting graph of aggregated TCP throughput versus traffic demand per flow for joint CRAFT-TP, joint CRAFT-RD and conventional approaches to routing and/or channel assignment in accordance in accordance with one or more embodiments described herein. In TCP, similar to UDP scenarios, more per flow traffic leads to higher throughput. TCP throughput is highly co-related with the loss rate and delay. The end-to-end delay increases with the traffic demand because when a node detects transmissions by other nodes in the interference range, the node delays transmitting. Higher traffic demand then results in longer queuing delay for each packet at a node, which increases the end-to-end delay. Joint CRAFT performs better than J-CAR and SPF+GBCA because better channel assignment can reduce the queuing delay significantly. Joint CRAFT-TP performs better than joint CRAFT-RD because links with higher traffic will be assigned to an idler channel first. This reduces most of the packet queuing delay.

Figure 17:
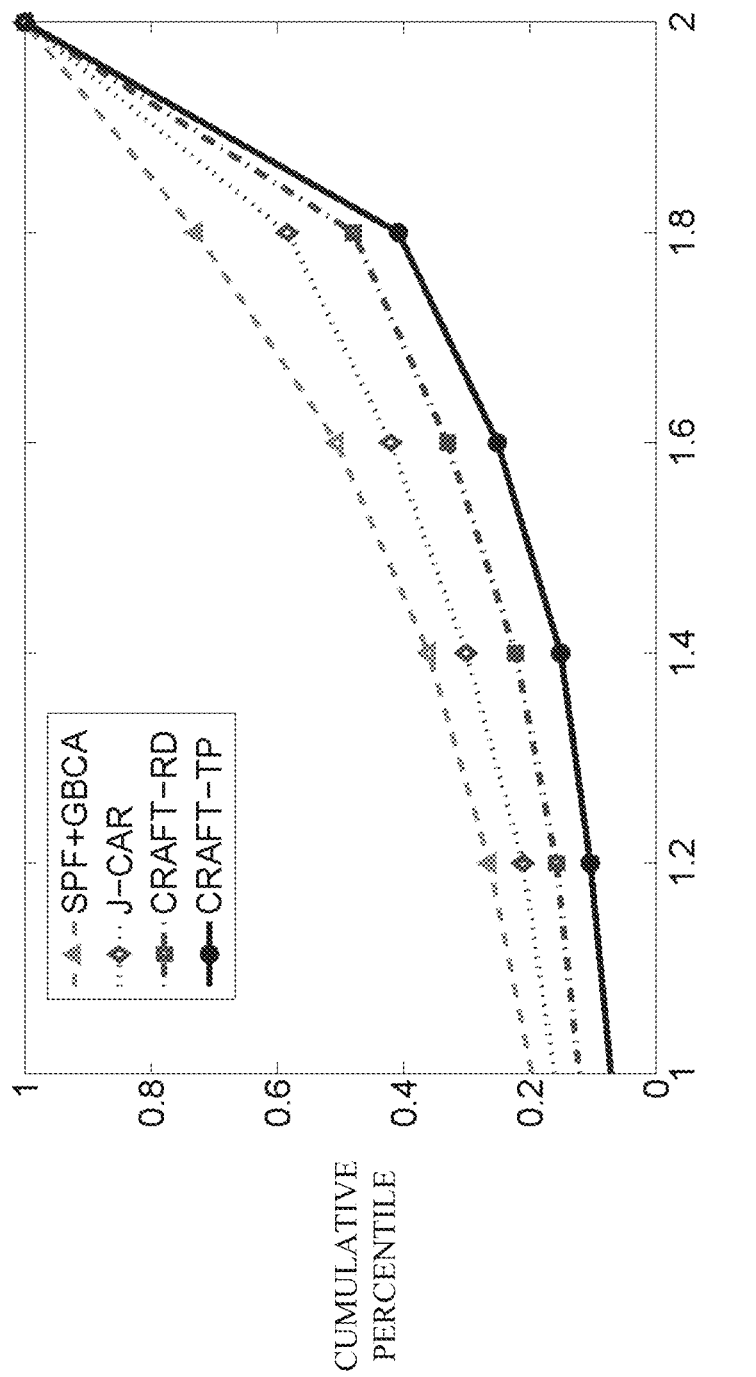
FIG. 17 is an exemplary non-limiting graph of cumulative distribution versus TCP throughput per flow employing joint CRAFT-TP, joint CRAFT-RD and conventional approaches to routing and/or channel assignment in accordance with one or more embodiments described herein.

FIG. 17 is an exemplary non-limiting graph of cumulative percentile versus TCP throughput per flow for joint CRAFT-TP, joint CRAFT-RD and conventional approaches to routing and/or channel assignment in accordance in accordance with one or more embodiments described herein. The cumulative percentile of joint CRAFT is lower than the J-CAR and SPF+GBCA schemes given a certain TCP throughput. This means that more flows using joint CRAFT have higher throughputs.

Figure 18:
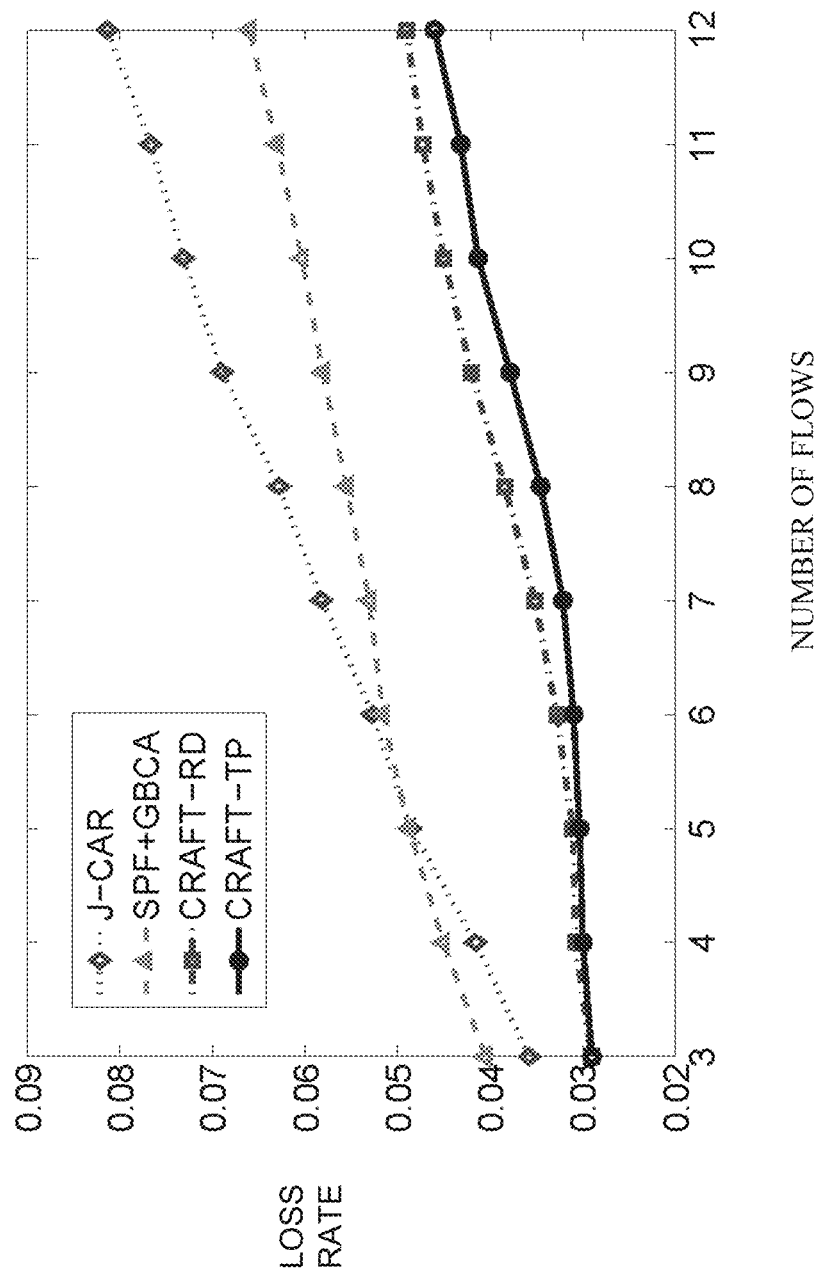
FIG. 18 is an exemplary non-limiting graph of UDP loss rate versus number of traffic flows employing joint CRAFT-TP, joint CRAFT-RD and conventional approaches to routing and/or channel assignment in accordance with one or more embodiments described herein.

FIG. 18 is an exemplary non-limiting graph of UDP loss rate versus number of traffic flows for joint CRAFT-TP, joint CRAFT-RD and conventional approaches to routing and/or channel assignment in accordance in accordance with one or more embodiments described herein. When flows are injected to the network, the links start interfering with each other such that the interference can block the packet transmissions. Thus, increasing number of flows means there is higher probability for the links to intercross with others and interference may not be able to be eliminated. Joint CRAFT outperforms the J-CAR and SPF+GBCA schemes with different number of flows in the network.

Figure 19:
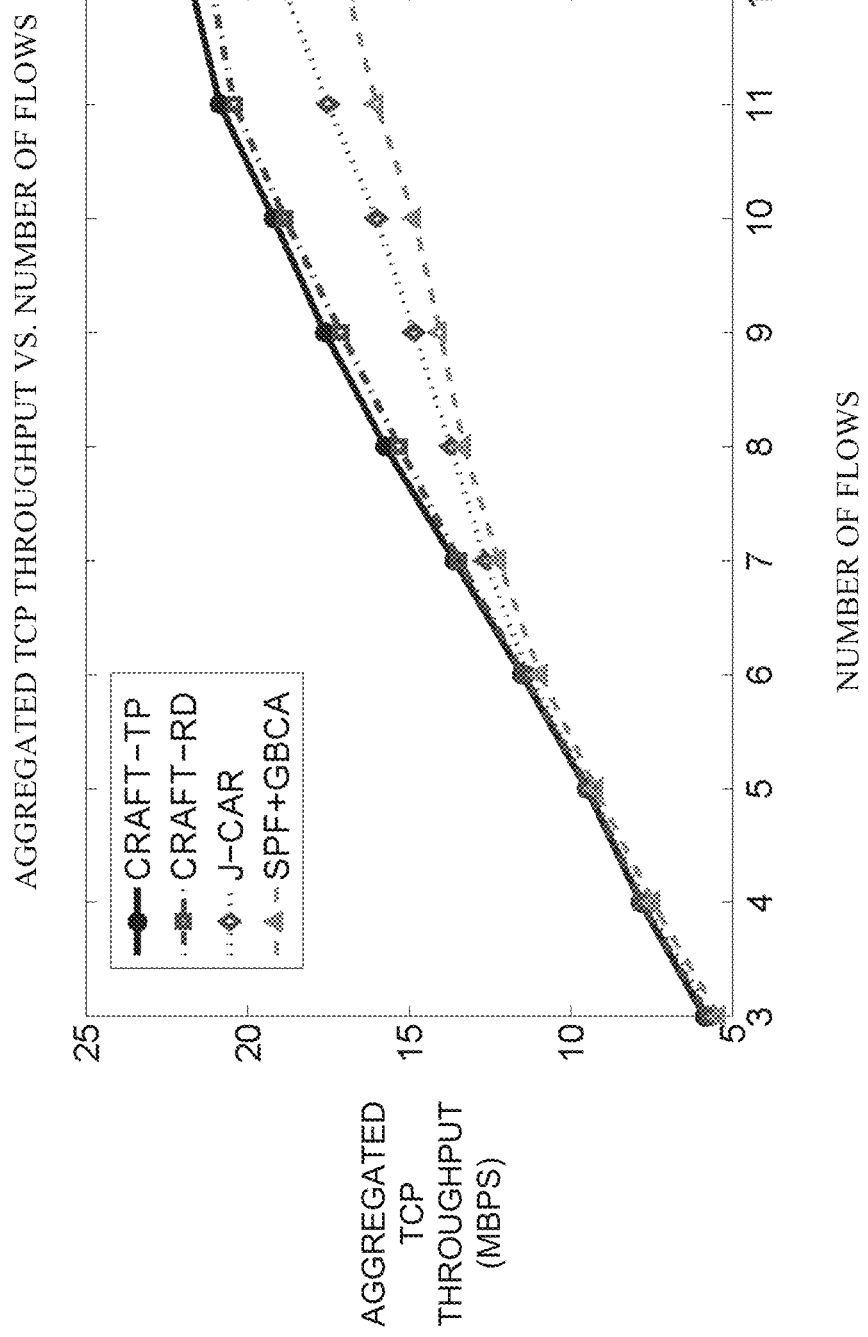
FIG. 19 is an exemplary non-limiting graph of average TCP throughput versus number of traffic flows employing joint CRAFT-TP, joint CRAFT-RD and conventional approaches to routing and/or channel assignment in accordance with one or more embodiments described herein.

FIG. 19 is an exemplary non-limiting graph of average TCP throughput versus number of traffic flows for joint CRAFT-TP, joint CRAFT-RD and conventional approaches to routing and/or channel assignment in accordance in accordance with one or more embodiments described herein. The aggregated TCP throughputs given different numbers of traffic flows is presented. As the number of flows increases, the difference between the measured throughput and the traffic demands becomes larger for joint CRAFT versus J-CAR and SPF+GBCA.

Figure 20:
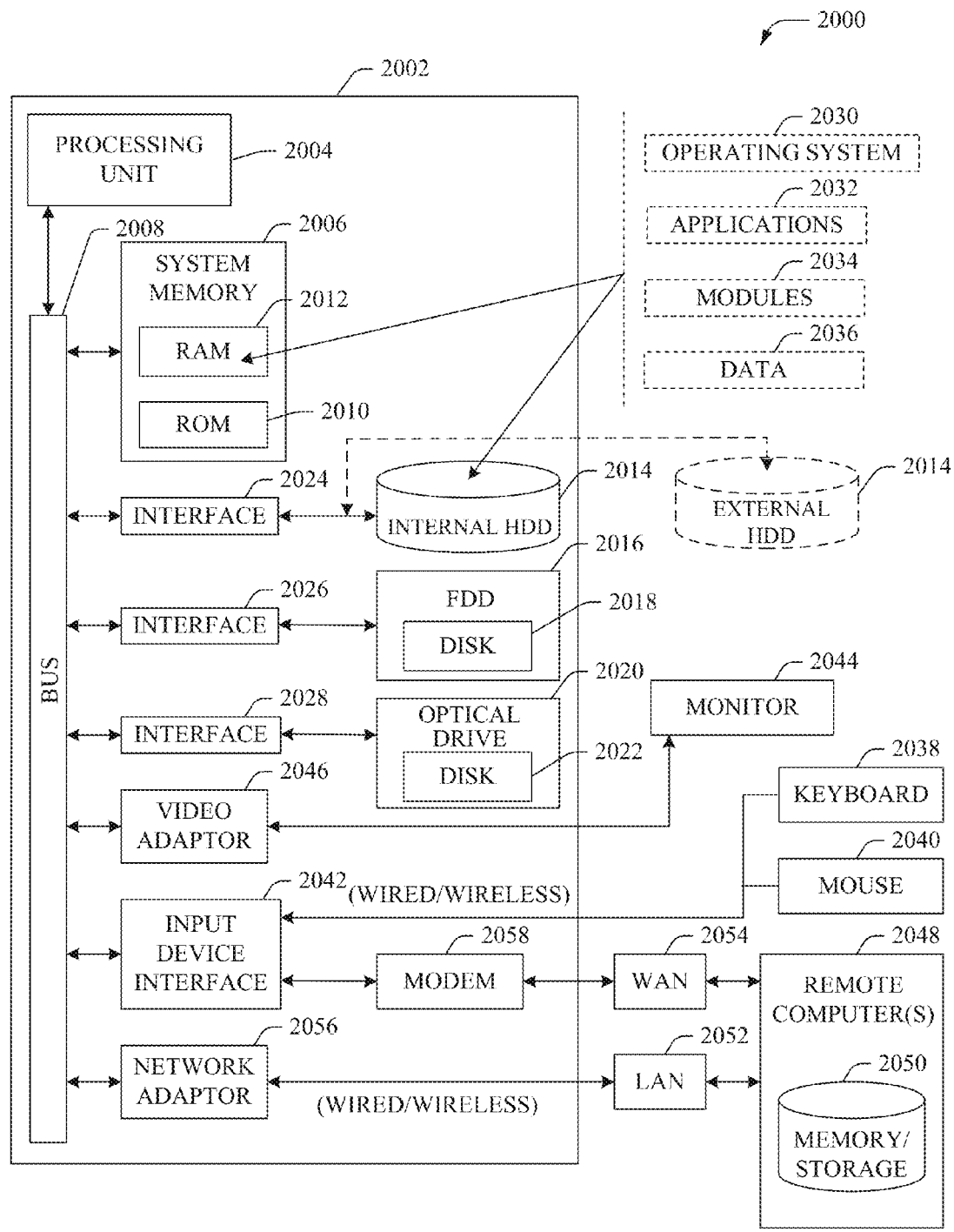
FIG. 20 is a block diagram of an exemplary non-limiting computer operable to facilitate joint CRAFT in accordance with embodiments described herein.

FIG. 20 is a block diagram of a computer operable to facilitate processing for facilitating joint CRAFT for MRMC WMNs in accordance with embodiments described herein. Some of the embodiments described herein can be practiced in computing environments and/or in collaboration with computing environments. In these environments, certain tasks can be performed by remote processing devices that are linked through a communications network. Also, some of the embodiments include computing devices having computer-executable instructions that can be executed by processors to perform one or more different functions. Those skilled in the art will recognize that the embodiments can be also implemented in combination with hardware and/or software.

In order to provide additional context for various embodiments described herein, FIG. 20 and the following discussion are intended to provide a brief, general description of a suitable computing environment 2000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The example environment 2000 for implementing various embodiments of the embodiments described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), which internal hard disk drive 2014 can also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

A mobile device can enter commands and information into the computer 2002 through one or more wired/wireless input devices, e.g., a keyboard 2038 and a pointing device, such as a mouse 2040. Other input devices (not shown) can include a microphone, an infrared (IR) remote control, a joystick, a game pad, a stylus pen, touch screen or the like. These and other input devices are often connected to the processing unit 2004 through an input device interface 2042 that can be coupled to the system bus 2008, but can be connected by other interfaces, such as a parallel port, an IEEE 1394 serial port, a game port, a universal serial bus (USB) port, an IR interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless AP disposed thereon for communicating with the wireless adapter 2056.

When used in a WAN networking environment, the computer 2002 can include a modem 2058 or can be connected to a communications server on the WAN 2054 or has other means for establishing communications over the WAN 2054, such as by way of the internet. The modem 2058, which can be internal or external and a wired or wireless device, can be connected to the system bus 2008 via the input device interface 2042. In a networked environment, program modules depicted relative to the computer 2002 or portions thereof, can be stored in the remote memory/storage device 2050. It will be appreciated that the network connections shown are example and other means of establishing a communications link between the computers can be used.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 21:
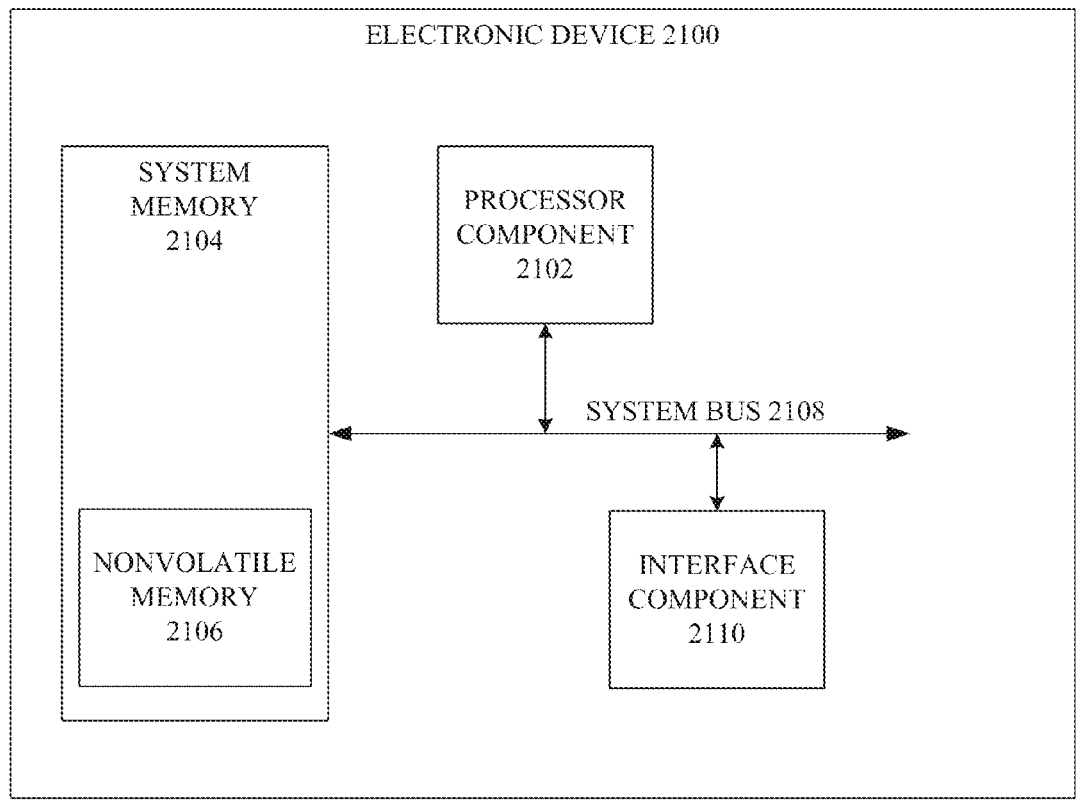
FIG. 21 is a block diagram of an exemplary electronic device that can facilitate joint CRAFT in accordance with various embodiments of the disclosed subject matter.

Referring to FIG. 21, illustrated is a block diagram of an exemplary, non-limiting electronic device 2100 that can perform joint CRAFT in accordance with aspects of the disclosed subject matter. The electronic device 2100 can include, but is not limited to, a node (e.g., node 104), a base station (BS), a mobile device, a computer, a laptop computer, or network equipment (e.g., routers, access points, femtocells, picocells) and the like.

Components of the electronic device 2100 can include, but are not limited to, a processor component 2102, a system memory 2104 (with nonvolatile memory 2106), and a system bus 2108 that can couple various system components including the system memory 2104 to the processor component 2102. The system bus 2108 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

The system memory 2104 can include computer-readable storage media in the form of volatile and/or nonvolatile memory 2106. A basic input/output system (BIOS), containing the basic routines that help to transfer information between elements within electronic device 2100, such as during start-up, can be stored in memory 2104. Memory 2104 can typically contain data and/or program modules that can be immediately accessible to and/or can be operated on by processor component 2102. By way of example, and not limitation, system memory 2104 can also include an operating system, application programs, other program modules, and program data. As a further example, system memory 2104 can include, but is not limited to, one or more joint channel and routing assignment information (generated by electronic device 2100 or other devices/nodes in a network with electronic device 2100), information indicative of a function associated with throughput of traffic in the network or the like.

The nonvolatile memory 2106 can be removable or non-removable. For example, the nonvolatile memory 2106 can be in the form of a removable memory card or a USB flash drive. In accordance with one aspect, the nonvolatile memory 2106 can include flash memory (e.g., single-bit flash memory, multi-bit flash memory), ROM, PROM, EPROM, EEPROM, and/or NVRAM (e.g., FeRAM), or a combination thereof, for example. Further, the flash memory can include NOR flash memory and/or NAND flash memory.

Information can be transmitted from and/or received at electronic device 2100 via interface component 2110. The information can be transmitted and/or received via a wireless and/or wireline channel. In some embodiments, other electronic devices, e.g., other BSs and/or nodes or mobile devices in a network can be communicatively coupled to electronic device 2100 by way of interface component 2110, which can facilitate transfer of feedback and/or downlink scheduling information.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

Wi-Fi can allow connection to the internet from a couch at home, a bed in a hotel room or a conference room at work, without wires. Wi-Fi is a wireless technology similar to that used in a cell phone that enables such devices, e.g., computers, to send and receive data indoors and out. Wi-Fi networks use radio technologies called IEEE 802.11 (a, b, g, n, etc.) to provide secure, reliable, fast wireless connectivity. A Wi-Fi network can be used to connect computers to each other, to the internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

Additionally, the following description refers to components being "connected," "coupled," "attached" and/or "adjoined" to one another. As used herein, unless expressly stated otherwise, the terms "connected," "coupled," "attached" and/or "adjoined" mean that one component is directly or indirectly connected to another component, mechanically, electrically or otherwise. Thus, although the figures may depict example arrangements of components, additional and/or intervening components may be present in one or more embodiments.

Further, terms like "node" and "node" refer to a device configured to transmit and/or receive information wirelessly. In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word "example" or "exemplary" is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

In some embodiments, a user can enter commands and information into the electronic device 2100 through input devices (not illustrated) such as a keypad, microphone, tablet or touch screen although other input devices can also be utilized. These and other input devices can be connected to the processor component 2102 through interface component 2110, which can be connected to the system bus 2108. Other interface and bus structures, such as a parallel port, game port or a universal serial bus (USB) can also be utilized. A graphics subsystem (not illustrated) can also be connected to the system bus 2108. A display device (not illustrated) can be also connected to the system bus 2108 via an interface, such as interface component 2110, which can in turn communicate with video memory. In addition to a display, the electronic device 2100 can also include other peripheral output devices such as speakers (not illustrated), which can be connected through interface component 2110.

It is to be understood and appreciated that the computer-implemented programs and software can be implemented within a standard computer architecture. While some aspects of the disclosure have been described above in the general context of computer-executable instructions that can run on one or more computers, those skilled in the art will recognize that the technology also can be implemented in combination with other program modules and/or as a combination of hardware and software.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications can be made to this configuration without departing from the scope or spirit of the disclosed subject matter.

Some portions of the detailed description can have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A method, comprising:
   determining, by a first node comprising a processor and part of a network with a plurality of nodes, resulting joint channel and routing assignment information for the first node, wherein the resulting joint channel and routing assignment information is determined based, at least, on a defined condition associated with a throughput due to interference of one or more traffic flows of traffic in the network, and wherein the resulting joint channel and routing assignment information comprises joint channel information and routing assignment information that are determined concurrently.

2. The method of claim 1, wherein the determining the resulting joint channel and routing assignment information comprises:
   iteratively updating, by the first node, joint channel and routing assignment information resulting in iteratively updated joint channel and routing assignment information;
   iteratively exchanging, by the first node, the iteratively updated joint channel and routing assignment information generated by the first node with one or more of the plurality of nodes in the network, wherein the iteratively exchanging comprises:
      receiving, by the first node, respective iteratively updated joint channel and routing assignment information generated by the one or more of the plurality of nodes; and
      transmitting, by the first node, the iteratively updated joint channel and routing assignment information generated by the first node;
   ceasing the iteratively updating; and
   selecting, by the first node, the iteratively updated joint channel and routing assignment information generated by the first node as the resulting joint channel and routing assignment, based, at least, on the defined condition being determined to be satisfied.

3. The method of claim 2, wherein the defined condition comprises a likelihood of an increase, by the first node and the one or more of the plurality of nodes, of the throughput due to the interference from one or more traffic flows of the traffic in the network, being greater than a defined value.

4. The method of claim 2, wherein the iteratively updating is performed in response to a likelihood of the throughput due to the interference from the one or more traffic flows of the traffic being increased employing the iteratively updated joint channel and routing assignment information, concurrently with maintaining one or more values of the respective iteratively joint channel and routing assignment information received from the one or more of the plurality of nodes during the iteratively exchanging, is greater than a defined value.

5. The method of claim 2, further comprising:
   routing, by the first node, the one or more traffic flows of the traffic in the network based on a link state routing protocol;
   randomly assigning, by the first node, respective channels to routes between the first node and the one or more of the plurality of nodes, wherein the routing and the randomly assigning are performed prior to the iteratively updating the joint channel and routing assignment information generated by the first node;
   generating, by the first node, initial joint channel and routing assignment information based, at least, on the routing and the randomly assigning; and
   exchanging, by the first node, the initial joint channel and routing assignment information with the one or more of the plurality of nodes in the network, wherein the exchanging comprises:
      receiving, by the first node, the initial joint channel and routing assignment information generated by the one or more of the plurality of nodes; and
      transmitting, by the first node, the initial joint channel and routing assignment information generated by the first node.

6. The method of claim 5, further comprising:
   initiating, by the first node, the iteratively updating the joint channel and routing assignment information after a random period of time elapses after receipt of respective initial joint channel and routing assignment information from the one or more of the plurality of nodes.

7. The method of claim 2, wherein the iteratively updating the joint channel and routing assignment information comprises:
   randomly identifying, by the first node, a sample routing assignment and a corresponding sample channel assignment;
   determining a sample value of the throughput due to the interference of the one or more traffic flows in the network based on the sample routing assignment and the corresponding sample channel assignment;
   comparing the sample value of the throughput with a current value of the throughput due to the interference of the one or more traffic flows in the network based on a current routing assignment and a corresponding current channel assignment; and
   selecting, by the first node, the sample routing assignment and the corresponding sample channel assignment as the iteratively updated joint channel and routing assignment information based, at least, on a determination that the sample value of the throughput is greater than the current value of the throughput.

8. The method of claim 2, wherein the iteratively updating the joint channel and routing assignment information comprises:
   selecting, by the first node, a sample routing assignment and a corresponding sample channel assignment,
      wherein the sample routing assignment includes information identifying a next hop node in a route towards a destination node of the plurality of nodes, wherein the destination node is associated with an amount of traffic that meets a defined traffic condition, and
      wherein the corresponding sample channel assignment includes information identifying a channel between the first node and the next hop node, wherein the channel is associated with a level of idleness that meets a defined idle state condition.

9. The method of claim 8, wherein the defined traffic condition being met comprises an amount of traffic associated with the destination node being greater than a defined amount.

10. The method of claim 8, wherein the defined idle state condition being met comprises an amount of time that the channel is idle being greater than a defined amount.

11. The method of claim 2, wherein the iteratively updating the joint channel and routing assignment information comprises:
   determining one or more amounts of traffic intended for respective one or more destination nodes of the plurality of nodes;
   ranking, in descending order, the respective one or more destination nodes of the plurality of nodes in the network based, at least, on the amounts of traffic intended for the one or more destination nodes;
   assigning, for traffic intended for the destination nodes in descending order, new joint channel and routing assignment information such that an estimated interference value meets a defined condition;
   calculating an interference value of the new joint channel and routing assignment information; and updating the new joint channel and routing assignment information for the first node based, at least, on the interference value of the new joint channel and routing assignment information for the first node being less than an interference value for previous values of the joint channel and routing assignment information for the first node.

12. The method of claim 11, wherein the assigning new joint channel and routing assignment information such that least interference values result comprises:
assigning a channel having a level of idleness greater than a first defined value; and
assigning a route associated with at least one of a number of hops or a delay or average traffic being less than a second defined value.

13. The method of claim 1, wherein the resulting joint channel and routing assignment information comprises first information indicative of a destination node of the plurality of nodes, second information indicative of a next hop node from the first node towards the destination node, and third information indicative of a channel between the first node and the next hop node.

14. An apparatus, comprising:
a memory to store instructions; and
a processor, coupled to the memory, that facilitates execution of the instructions to perform operations, comprising:
determining joint channel and routing assignment information based on information distributed between the apparatus and one or more of a plurality of nodes and determination of a value of a function associated with throughput due to interference of traffic in a network, wherein the apparatus and the one or more of the plurality of nodes are communicatively coupled via the network, and wherein joint channel information and routing assignment information of the joint channel and routing assignment information are determined concurrently.

15. The apparatus of claim 14, wherein the determining the joint channel and routing assignment information comprises:
determining an initial set of joint channel and routing assignment information, wherein the determining the initial set of joint channel and routing assignment information is based, at least, on a random determination by the apparatus or a determination based on a level of the traffic at a destination node of the plurality of nodes.

16. The apparatus of claim 15, further comprising:
adopting updated joint channel and routing assignment information from the initial set of joint channel and routing assignment information based, at least, an increase of a value of the function resulting from the updated joint channel and routing assignment information.

17. A system, comprising:
a plurality of nodes of a network, wherein the plurality of nodes is configured to perform joint channel and routing assignment of traffic of the network based, at least, on a likelihood of increase of a value of a function associated with throughput of the traffic within the network, wherein the likelihood of increase of the value of the function associated with throughput of the traffic within the network is based on signal strength of a node of the plurality of nodes.

18. The system of claim 17, wherein the plurality of nodes being configured to perform joint channel and routing assignment comprises the plurality of nodes being configured to perform distributed joint channel and routing assignment based on information iteratively exchanged between one or more of the plurality of nodes.

19. The system of claim 17, wherein the plurality of nodes is further configured to perform the joint channel and routing assignment based, at least, on information from a central controller communicatively coupled to the network.

20. The system of claim 17, wherein the plurality of nodes is further configured to generate network information comprised of information indicative of joint channel and routing assignment from the plurality of nodes based, at least, on the likelihood of increase in throughput being greater than a defined value.

* * * * *